(12) United States Patent
Kourogi et al.

(10) Patent No.: US 7,222,045 B2
(45) Date of Patent: May 22, 2007

(54) ATTITUDE ANGLE PROCESSOR AND ATTITUDE ANGLE PROCESSING METHOD

(75) Inventors: Masakatsu Kourogi, Ibaraki (JP); Takeshi Kurata, Ibaraki (JP); Takakazu Kato, Ibaraki (JP); Takashi Okuma, Ibaraki (JP); Nobuchika Sakata, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/542,360

(22) Filed: Apr. 14, 2006

(65) Prior Publication Data

US 2006/0217921 A1   Sep. 28, 2006

(30) Foreign Application Priority Data

Jan. 15, 2003   (JP) .............................. 2003-007660

(51) Int. Cl.
*G06F 15/00* (2006.01)
(52) U.S. Cl. .................. 702/150; 702/42; 702/141; 702/94; 702/151
(58) Field of Classification Search .................. 702/42, 702/141, 150, 151, 94; 700/245, 253; 73/862.08, 73/65.07; 33/355 R, 356; 600/587, 490; 318/568.1; 180/8.1, 8.6; 345/474
See application file for complete search history.

(56) References Cited

U.S. PATENT DOCUMENTS

| | | | | |
|---|---|---|---|---|
| 4,831,544 A | * | 5/1989 | Hojo et al. ................... 701/25 |
| 4,866,617 A | * | 9/1989 | Matsuda et al. ............... 701/25 |
| 6,636,826 B1 | * | 10/2003 | Abe et al. .................... 702/151 |
| 2002/0103610 A1 | * | 8/2002 | Bachman et al. ............. 702/94 |
| 2005/0044737 A1 | * | 3/2005 | Choi et al. ..................... 33/356 |
| 2005/0143949 A1 | * | 6/2005 | Hagstedt ..................... 702/145 |
| 2005/0182341 A1 | * | 8/2005 | Katayama et al. .......... 600/587 |
| 2006/0132675 A1 | * | 6/2006 | Choi ........................... 349/76 |

FOREIGN PATENT DOCUMENTS

| | | |
|---|---|---|
| JP | 11-023298 | 1/1999 |
| JP | 11-211474 | 8/1999 |
| JP | 11-211479 | 8/1999 |
| JP | 3038452 B | 3/2000 |

* cited by examiner

*Primary Examiner*—Carol S. W. Tsai
(74) *Attorney, Agent, or Firm*—Morgan, Lewis & Bockius

(57) ABSTRACT

A posture angle processing apparatus includes a magnetic sensor, a gravitational acceleration sensor, a position information acquisition device, and a dip angle database device wherein a correlation of the absolute location and a geomagnetic dip angle at the corresponding point is stored. Based on the absolute location of the current point, a dip angle estimation and determination device reads the geomagnetic dip angle at the current point, calculates an angle formed by a horizontal plane and the magnetic vector, compares the angle formed by the magnetic vector and the horizontal plane with the geomagnetic dip angle of the current point, and outputs either a true signal or a false signal depending on the error between the angle and the geomagnetic dip angle.

16 Claims, 35 Drawing Sheets

| ABSOLUTE LOCATION | DIP ANGLE |
|---|---|
| E133'00"00-133'30"00<br>N35'00"00-35'30"00 | 49.25 DEGREES |
| E133'30"00-134'00"00<br>N35'00"00-35'30"00 | 49.23 DEGREES |
| ⋮ | ⋮ |

FIG. 36

| ABSOLUTE LOCATION | YAW ANGLE |
|---|---|
| E133'00"00-133'30"00<br>N35'00"00-35'30"00 | 4.51 DEGREES |
| E133'30"00-134'00"00<br>N35'00"00-35'30"00 | 4.45 DEGREES |
| ⋮ | ⋮ |

ATTITUDE ANGLE PROCESSOR AND ATTITUDE ANGLE PROCESSING METHOD

TECHNICAL FIELD

The present invention relates to a posture angle processing apparatus that when carried by a person, for example, can correctly obtain information as to the posture angle of the person, and a posture angle processing method. In particular, the present invention relates to a posture angle processing apparatus that can employ a group of mountable, compact, light and inexpensive sensors for obtaining an absolute posture angle for an object to be measured (a small device such as a cellular phone or a PDA (Personal Digital Assistant), a human body, etc.), and a posture angle processing method.

RELATED ART

A technique whereby a magnetic sensor and a tilt angle sensor, or a gravitational acceleration sensor is employed to obtain an absolute posture angle is a known conventional technique. Also, a technique whereby an angular velocity sensor is employed to measure a posture change relative to a specific absolute reference posture angle is a known conventional technique. There have been attempts to employ these sensors together so as to more accurately and robustly measure the absolute posture angle of an object to measured.

[Patent Document 1] Japanese Patent No. 3,038,452
[Patent Document 2] JP-A-Heill-211479

DISCLOSURE OF THE INVENTION

According to the current method whereby the absolute posture angle is based on a geomagnetic vector that is estimated by using a magnetic sensor, since especially in an indoor environment disruption of the magnetic field occurs due to the use of various electronic apparatuses and to the structures of buildings, problems exist in that it is difficult to measure geomagnetism reliably and that the sensor can not be stably and correctly operated in an environment having a wide range.

Further, according to the method for measuring the relative posture angle using a gyrosensor and an acceleration sensor, an angular velocity vector measured by the gyrosensor and an acceleration vector measured by the acceleration vector are added together, and each time, the absolute posture angle that serves as a reference is updated to obtain an estimated relative posture angle. However, because of a drift component, etc., included in the output of the gyrosensor, a problem here is that it is difficult for the absolute posture angle to be continuously obtained for an extended period of time.

The gyrosensor and the acceleration sensor, which are employed for an inertial measurement unit (IMU) mounted in an airplane, can measure, to a very high degree of accuracy, a change in the posture angle relative to the absolute posture angle that serves as a reference. However, because of size, weight and economic problems, it is difficult for to attach these sensors to a small device or to a human body.

It is, therefore, one objective of the present invention to provide a posture angle processing apparatus that, even in an environment wherein, due to the disruption of the magnetic field, it is difficult to stably obtain a reliable geomagnetic vector, can accurately obtain information for the posture angle of a person, for example, when carried by the person, and a posture angle processing method.

The present invention is characterized in that a posture angle processing apparatus and a posture angle processing method are established by employing the following basic principle.

Specifically, an angle formed by a magnetic vector, measured by a magnetic sensor, and a gravitational acceleration vector, measured by a gravitational acceleration sensor (or a tilt angle sensor), can be employed to calculate an angle that is formed by a horizontal plane and the geomagnetic vector. Thus, based on information (e.g., the latitude and longitude) for a current location, the obtained angle is compared with a dip angle extracted from a previously prepared database. This dip angle is uniquely defined in accordance with the latitude and the longitude. The database for the dip angle can be constructed, for example, by employing a geomagnetic map issued by the Geographical Survey Institute. So long as the magnetic sensor can measure the correct geomagnetic vector, the two angles should match. When the two angles do not match, it is assumed that disruption of the magnetic field is present, and the output of the magnetic sensor is regarded as unreliable.

Thus, according to the basic principle of the present invention, the posture angle processing apparatus is designed so that when the measured dip angle and the dip angle in the database match a true signal is output, which indicates the output of the magnetic sensor is reliable, or so that in the other case a false signal is output, which indicates that the output of the magnetic sensor is unreliable.

When the obtained dip angle formed by the horizontal plane and the magnetic vector is compared with the actual dip angle only at a fixed point, the two angles may match by coincident, and a signal may be output indicating that the magnetic vector that is unreliable is regarded as being reliable (an erroneous detection). Therefore, according to the basic principle of the present invention, an apparatus for detecting the continuous movement of an object to be measured is provided, so that the dip angle formed by the horizontal plane and the magnetic vector is continuously compared, at different points, with the actual dip angle, and the possibility the above described erroneous detection will occur is reduced. When a person is the object to be measured, an apparatus for detecting that the person is walking, the basic movement form for a person, is employed as the apparatus for detecting movement, and an acceleration sensor is used as the sensor for detecting walking.

Thus, according to a first aspect of the present invention, there is provided with a posture angle processing apparatus including:

a magnetic sensor for detecting magnetic vectors, for three axes that intersect each other;

a gravitational acceleration sensor, for measuring gravitational acceleration vectors for three axes that intersect each other;

a position information acquisition device, for obtaining a current absolute position;

a dip angle database device, for storing a correlation with an absolute position and a geomagnetic dip angle; and a dip angle estimation and determination device, for calculating an angle formed by a magnetic vector, measured by the magnetic sensor, and a gravitational acceleration vector, measured by the gravitational acceleration sensor, to obtain an angle that is formed by a horizontal plane and the magnetic vector, and for, based on the current position obtained by the position information acquisition device, comparing a dip angle extracted from the dip angle database device with the angle formed by the horizontal plane and the magnetic vector, and when a difference is within a predetermined range, outputting a true signal, and in the other case, outputting a false signal.

According to a second aspect of the invention, there is provided with the posture angle processing apparatus in addition to the first aspect, further including:

a movement detection device, for detecting the moving state of an object to be measured; and a signal output device, for, when the movement detection device is detecting a moving state exceeding a predetermined moving distance or a moving time period and when the dip angle estimation and determination device in the first aspect is continuously outputting a true signal, outputting a true signal, and in other cases, outputting a false signal.

According to a third aspect of the invention, there is provided with the posture angle processing apparatus in the first aspect, further including:

an absolute posture angle estimation device, for, when the dip angle estimation and determination device is outputting a true signal, regarding as a geomagnetic vector a magnetic vector measured by the magnetic sensor, and for estimating and outputting an absolute posture angle, based on a gravitational acceleration vector, measured by the gravitational acceleration sensor, and the magnetic vector. When the geomagnetic vector and the gravitational acceleration vector (i.e., a vertical direction) are provided, theoretically, the absolute posture angle of the sensor is uniquely determined.

According to a fourth aspect of the invention, there is provided with the posture angle processing apparatus in the second aspect, wherein a person is employed as the object to be measured, and a walking detection device for detecting that the person is walking is employed as the device for detecting the moving state.

According to a fifth aspect of the invention, there is provided with the posture angle processing apparatus in the second aspect, further including:

an absolute posture angle estimation device, for, when the dip angle estimation and determination device is outputting a true signal, regarding as a geomagnetic vector a magnetic vector measured by the magnetic sensor, and for calculating an absolute posture angle, based on a gravitational acceleration vector, measured by the gravitational acceleration sensor, and the magnetic vector. So long as the geomagnetic vector and the gravitational acceleration vector (i.e., a vertical direction) are provided, theoretically the absolute posture angle of the sensor is uniquely determined. Thus, the absolute posture angle is obtained.

According to a sixth aspect of the invention, there is provided with the posture angle processing apparatus in addition to the fourth aspect, further including:

a walking detection device including; an acceleration sensor that measures acceleration vectors for three axes that intersect each other, for detecting a vertical direction from a gravitational acceleration vector detected by the gravitational acceleration sensor, for detecting a typical pattern created by the walking of a person by examining a component relative to the vertical direction of an acceleration vector that is detected by an acceleration sensor, for detecting a typical pattern created by the walking of a person by examining a component relative to a plane that intersects the vertical direction of the acceleration vector, and for employing the two pattern detection results to detect the person is walking.

According to a seventh aspect of the invention, there is provided with the posture angle processing apparatus in addition to the third aspect, further including:

an absolute posture angle output device including; an angular velocity sensor that detects angular velocity vectors along three axes that intersect each other, for, when the dip angle estimation and determination device is outputting a true signal, outputting as a current absolute posture angle an absolute posture angle output by the absolute posture angle estimation device, and for, when the dip angle estimation and determination device is outputting a false signal, adding angular velocity vectors, measured by the angular velocity sensor while using, as a reference, the last absolute posture angle output as the current absolute posture angle, and estimating and outputting a current absolute posture angle.

According to an eighth aspect of the invention, there is provided with the posture angle processing apparatus in addition to the fifth aspect, further including:

a device including; an angular velocity sensor for detecting angular velocity vectors along three axes that intersect each other, for, when the dip angle estimation and determination device is outputting a true signal, outputting as a current absolute posture angle an absolute posture angle output by the absolute posture angle estimation device, and for, when the dip angle estimation device is outputting a false signal, adding angular velocity vectors measured by the angular velocity vector while using, as a reference, the last absolute posture angle that is output as the current absolute posture angle, and estimating and outputting a current absolute posture angle.

According to a ninth aspect of the invention, first, by employing a magnetic vector depression angle calculation member, magnetic vectors for three axes that are obtained by measuring a magnetic vector and that intersect each other, and gravitational acceleration vectors for three axes that are obtained by measuring gravitational acceleration and that intersect each other are employed to calculate angles formed by the magnetic vectors and the gravitational acceleration vector, i.e., angles formed by a horizontal plane and the magnetic vectors. In parallel to this calculation, a database wherein a dip angle database is located is examined by using, as a search key, the absolute position of the location obtained in accordance with position information, and the angle of dip of the geomagnetism at the current location is acquired. Comparison member compares each of the angles formed by the horizontal plane and the magnetic vectors with the obtained dip angle, and when a difference obtained by the comparison is within a predetermined range, a true signal is output, indicating the magnetic vectors are reliable. In the other case, a false signal is output, indicating that the magnetic vectors are not reliable.

According to a tenth aspect of the invention, since in the ninth aspect, the angle formed by the horizontal plane and the magnetic vector is compared with the actual dip angle only at a fixed point, the two signals may match by coincidence, and a true signal, indicating that the unreliable magnetic vector is reliable, may be output (an erroneous detection). In the tenth aspect, in addition to the ninth aspect, a movement detection member for detecting the continuous movement of an object to be measured is employed. When the movement detection member is detecting the continuous movement, and is continuously outputting a true signal, the true signal is output, or in the other case, a false signal is output. Therefore, since the angle formed by the horizontal plane and the magnetic vector is continuously compared with the actual dip angle at different points, the possibility an erroneous detection will be made can be reduced.

According to an eleventh aspect of the invention, there is provided with the posture angle processing apparatus in addition to the ninth aspect, wherein a magnetic vector obtained by the magnetic sensor is regarded as a geomagnetic vector, and the geomagnetic vector and a gravitational acceleration vector obtained by the gravitational acceleration sensor are employed together to estimate and output a current absolute posture angle. Further, when a true signal indicating that the current output of the magnetic sensor is being output, a true signal, indicating that the absolute posture angle that is output is reliable, is output, and in other cases, a false signal, indicating that the absolute posture angle that is output is not reliable, is output.

According to a twelfth aspect of the invention, a walking detection member for detecting that a person is walking person is employed as the movement detection member, in the tenth aspect, that detects continuous movement, while assuming a person or a device mounted on a person is an object to be measured.

According to a thirteenth aspect of the invention, there is provided with the posture angle processing apparatus in addition to the tenth aspect, a magnetic vector obtained by the magnetic sensor is regarded as a geomagnetic vector, and an absolute posture angle estimation member estimates and outputs a current absolute posture angle by employing together the geomagnetic vector and a gravitational acceleration vector, which is obtained by the gravitational acceleration sensor. When a true signal, indicating that the current output of the magnetic sensor is reliable, is being output, a true signal, indicating that the absolute posture angle that is output is reliable, is output, and in the other case, a false signal, indicating that the absolute posture angle that is being output is not reliable, is output.

According to a fourteenth aspect of the invention, there is provided with the posture angle processing apparatus in the twelfth aspect, wherein an acceleration vector is measured, and a typical acceleration pattern created by a person when walking is detected in order to identify the presence or absence of walking. Since when a person is walking there are characteristic patterns in the acceleration components in the vertical direction and in the direction of travel, these patterns must be identified. In order to detect the vertical direction, a gravitational acceleration sensor (or a tilt angle sensor) is employed. Of the outputs of the acceleration sensor, the direction that is a component projected onto a plane (i.e., the horizontal plane) perpendicular to the vertical direction and in which the amplitude is the maximum in a time series is regarded as the direction of travel. By detecting a pattern that appears in the acceleration component in this direction, that a person is walking can be detected more accurately than by observing the acceleration component only in the vertical direction.

According to a fifteenth aspect, there is provided with the invention in addition to the eleventh aspect, further including:

an angle velocity vector measurement member for measuring angular velocity vectors along three axes that intersect each other. When a true signal, indicating that the absolute posture angle that is currently output is reliable, is being output, this absolute posture angle is obtained as a reference absolute posture angle and is output as a current absolute posture angle. In the other case, the reference absolute posture angle and angular velocity vectors obtained by the angular velocity vector measurement member are added together to update the reference absolute posture angle, and the updated reference absolute posture angle is output.

According to a sixteenth aspect of the invention, there is provided with the posture angle processing apparatus in addition to the thirteenth aspect, further including: a member for measuring an angular velocity vector. When a true signal, indicating that an absolute posture angle that is currently output is reliable, is being output, the absolute posture angle is obtained as a reference absolute posture angle and is output as a current absolute posture angle. In the other case, the reference absolute posture angle and an angular velocity vector obtained by the member that measures an angular velocity vector are added together to update a reference absolute posture angle, and the updated reference absolute posture angle is output.

BRIEF DESCRIPTION OF THE DRAWINGS

FIG. 36 is a diagram for explaining the data structure of a yaw angle database device.

BEST MODES FOR CARRYING OUT THE INVENTION

Figure 1:
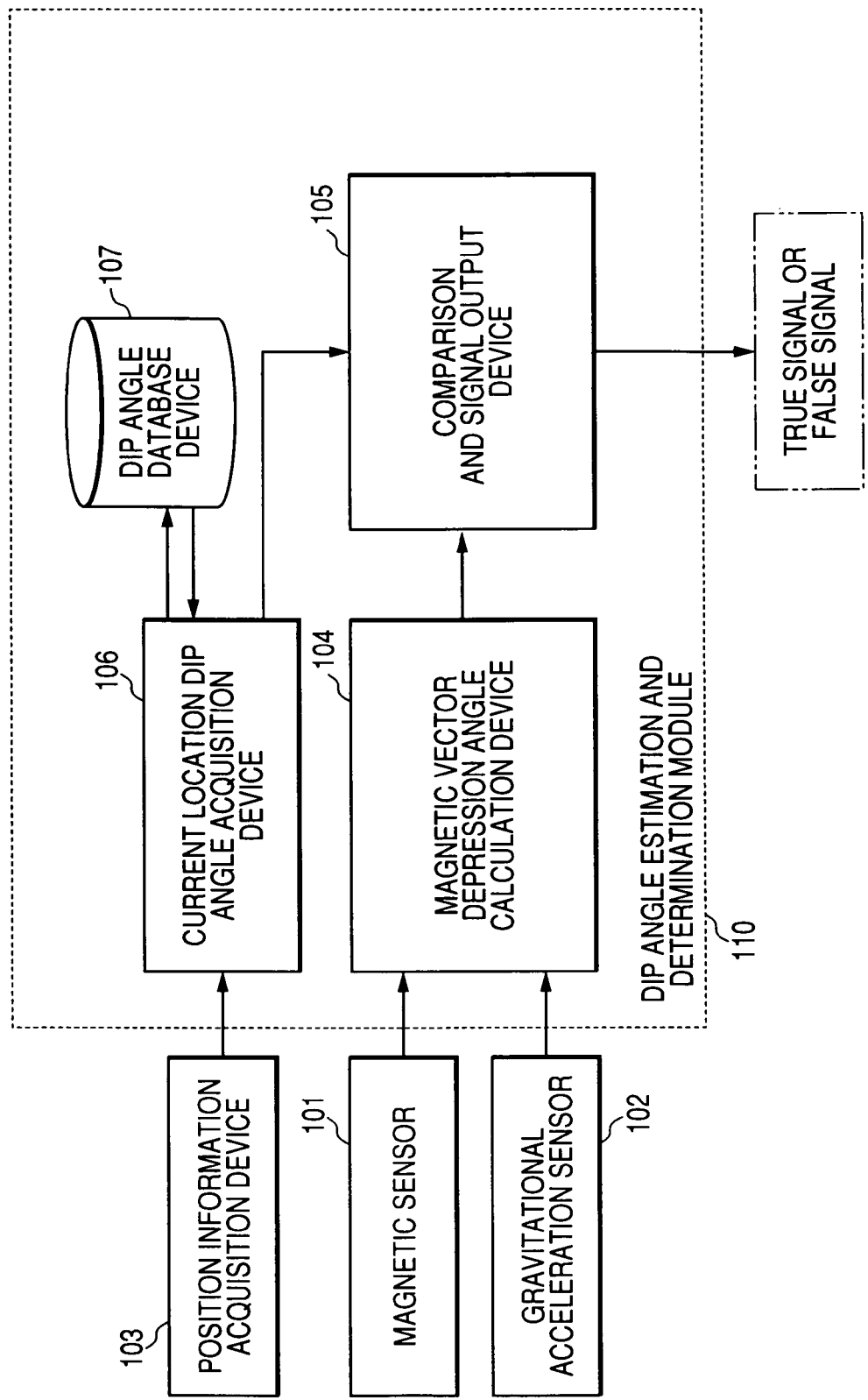
FIG. 1 is a block diagram showing a first aspect of the present invention.

FIG. 1 is a block diagram showing a first aspect of the present invention. In the aspect shown in FIG. 1, a magnetic sensor 101 is an apparatus for measuring magnetic vectors for three axes at an object to be measured, and is provided by employing together, for example, magnetic sensors HMC1052 and HMC1051Z, which are marketed by Honeywell Corp. A gravitational acceleration sensor 102 is an apparatus for measuring gravitational acceleration vectors for three axes that intersect each other at an object to be measured, and is provided by employing, for example, acceleration sensor ADXL202, which is marketed by Analog Devices Corp., and a digital filter, or by using sensor module 3DM-G, which is produced and sold by MicroStrain Corp. A position information acquisition device 103 is a device for obtaining the absolute location of an object to be measured, and as an example, a device for receiving a signal from a GPS (Global Positioning System) satellite or a device, such as a cellular phone or a PHS (Personal Handyphone System), that obtains base station information is employed. As another example, a device, such as a beacon, for receiving a wave signal or an infrared signal or a device that obtains a current location by comparing an image, obtained by a CCD camera, with images in an image database, wherein photographed position information is registered in advance, is employed. By using such a device, the absolute position of the current location can be obtained by using a normalized expression (e.g., the longitude and the latitude description).

Figures 34, 35:
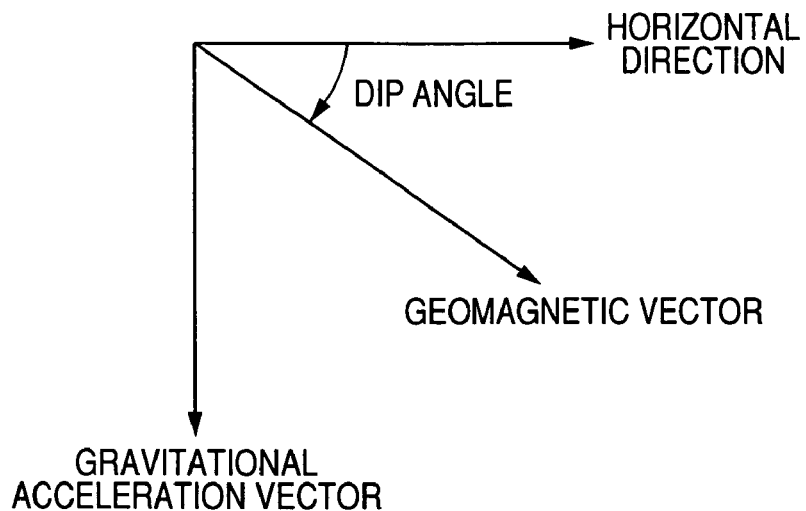
FIG. 34 is a diagram for explaining a relationship for a geomagnetic vector, a gravitational acceleration vector and a horizontal direction.
FIG. 35 is a diagram for explaining the data structure of a dip angle database device.

A magnetic vector depression angle calculation device 104 employs magnetic vectors for three axes obtained by the magnetic sensor 101 and gravitational acceleration vectors for three axes obtained by the gravitational acceleration sensor 102, calculates angles formed by the magnetic vectors and the gravitational acceleration vectors, and calculates a horizontal plane and a magnetic vector, based on the obtained results. The magnetic vector depression angle calculation device is provided by using a special operation circuit or a microprocessor (CPU), a program for a general-purpose computer, etc. The relationship of a geomagnetic vector, a gravitational acceleration vector and the horizontal direction is as shown in FIG. 34, and in accordance with this relationship, the geomagnetic vector and the gravitational acceleration vector, the dip angle and the horizontal direction are determined.

A current location dip angle acquisition device 106 is a device that converts the absolute location obtained by the position information acquisition device 103 into a location having a general-purpose expression form (e.g., a longitude and latitude expression), and that issues an inquiry to a dip angle database device 107 while using this expression form as a key and obtains, as a reply, the geomagnetic dip angle at the current location. This device is provided by using a special operation circuit or a microprocessor (CPU), a program for a general-purpose computer, etc.

The dip angle database device 107 is a device that includes a database wherein absolute locations and corresponding dip angles are stored in correlation with each other, and a mechanism for comparing and extracting these data. The dip angle database device 107 is provided by using a storage medium, such as a magnetic disk or an optical disk, on which the database data are stored, a special operation circuit, which obtains a geomagnetic dip angle by using the absolute location as a key, or a microprocessor (CPU), a program for a general-purpose computer, etc. As shown in FIG. 35, a table form wherein absolute locations and dip angles are correlated with each other, for example, is employed as the data form for the database of the dip angle database device 107.

A comparison and signal output device 105 is a device that compares with the dip angle received from the current location dip angle acquisition device 106 the dip angle received from the magnetic vector depression angle calculation device 104, and that outputs a true signal when a difference in the two angles is within a predetermined range, or outputs a false signal in other cases. The comparison and signal output device 105 is provided by using a special operation circuit or a microprocessor (CPU), having a comparison and conditional branching operation function and an output function, a program for a general-purpose computer, etc. A dip angle estimation and determination module 110 that includes these devices is provided as a processing module that includes the magnetic vector depression angle calculation device 104, the comparison and signal output device 105, the current location dip angle acquisition device 106 and the dip angle database device 107, and is not only the essential portion of a posture angle processing apparatus of the present invention, but also serves as a posture angle processing apparatus according to the first aspect of the present invention.

Figure 2:
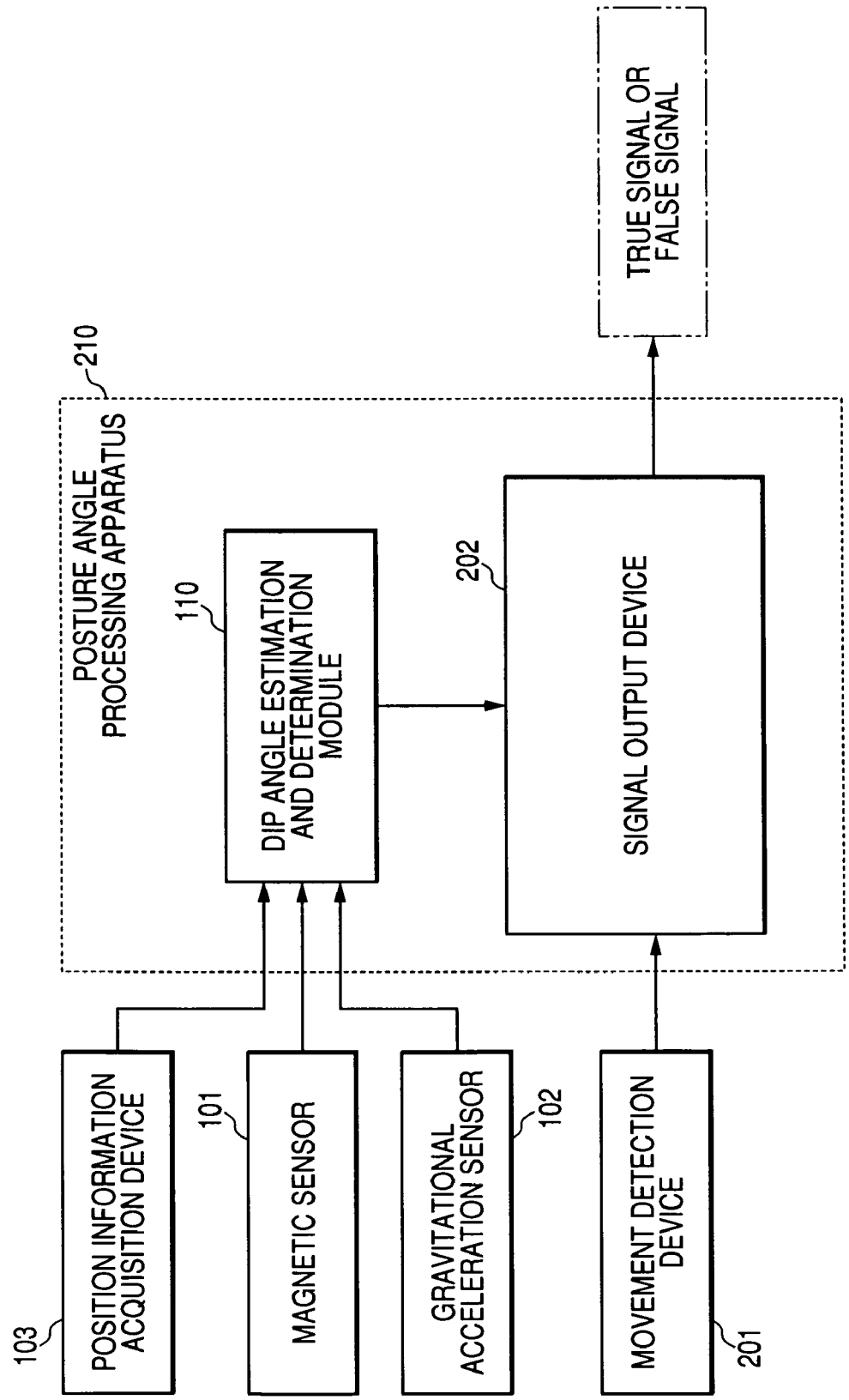
FIG. 2 is a block diagram showing a second aspect of the present invention.

FIG. 2 is a block diagram showing a second aspect of the present invention. In FIG. 2, the same reference numerals as in the first aspect are used to denote identical components. A movement detection device 201 is a device for detecting whether an object to be measured is moving. When the object is an automobile, a speedometer, for example, can be employed. When the object is an airplane, a device that calculates a time-sequence change (a mmoving vector between the previous location and time and the current location and time) for the absolute position information received from a GPS satellite, or a ground speedometer, for example, can be employed. When a human being is the object to be measured, a pedometer can be employed. An apparatus 110 is a processing module explained while referring to FIG. 1. Specifically, as previously described, the apparatus 110 includes a magnetic vector depression angle calculation device 104, a comparison and signal output device 105, a current location dip angle acquisition device 106 and a dip angle database device 107.

A signal output device 202 is a device that outputs a true signal only when the movement detection device 201 is detecting the continuous movement of an object to be measured, at the same time as the dip angle estimation and determination module 110, which is the above described processing module, is continuously outputting a true signal, and that outputs a false signal in other cases. The signal output device 202 is provided by using a special operation circuit or a microprocessor (CPU) that includes a comparison and conditional branching operation function and a temporary storage device, a program for a general-purpose computer, etc.

Figure 3:
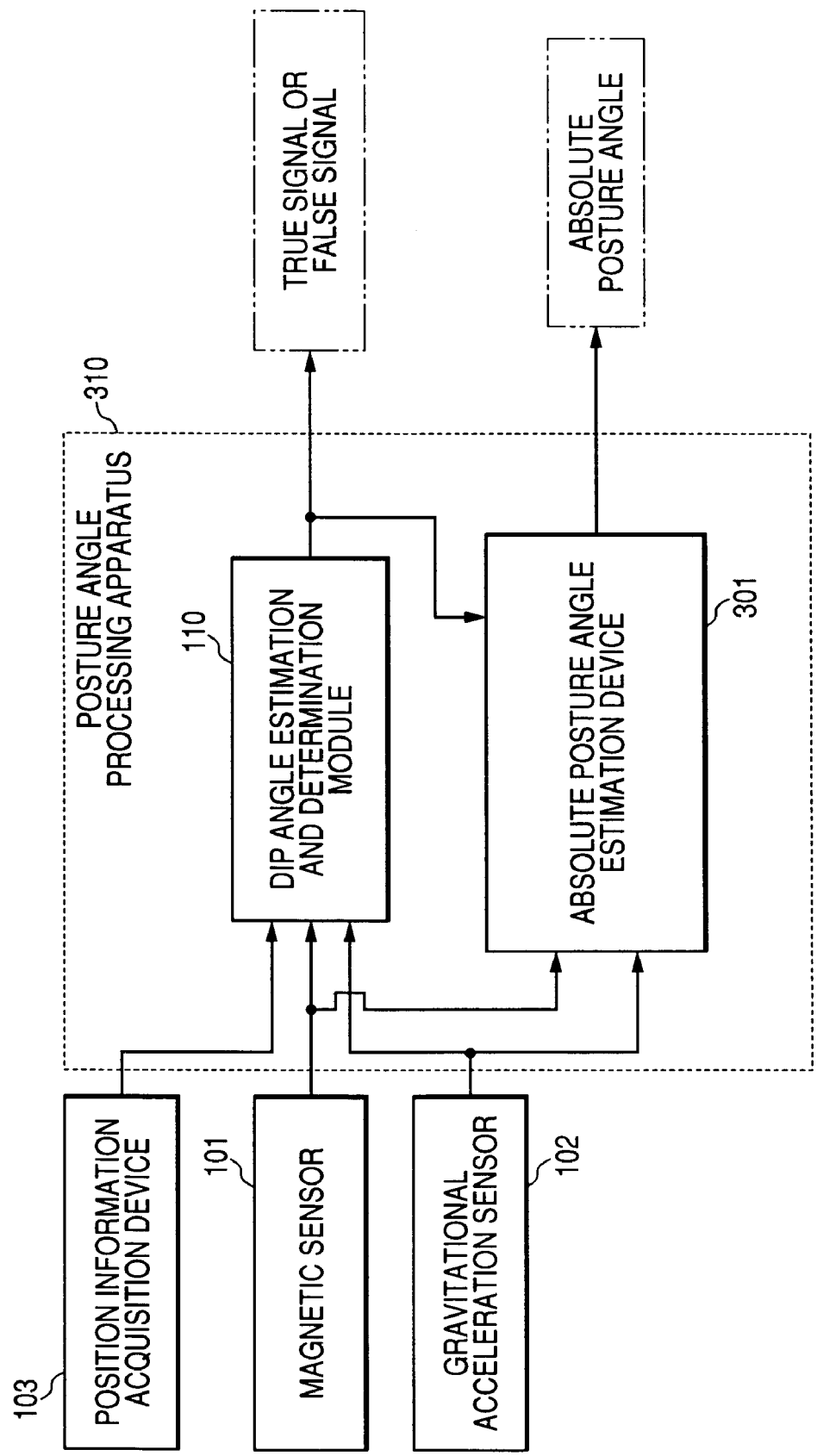
FIG. 3 is a block diagram showing a third aspect of the present invention.

FIG. 3 is a block diagram showing a third aspect of the present invention. In the aspect shown in FIG. 3, a horizontal plane is obtained in accordance with gravitational acceleration vectors for three axes measured by a gravitational acceleration sensor 102, and thereafter, magnetic vectors for three axes, measured by a magnetic vector 101, are regarded as geomagnetic vectors, and the current absolute posture angle is calculated, based on the horizontal plane and the geomagnetic vectors. An absolute posture angle estimation device 301 is a device for performing an operation for calculating the absolute posture angle and for outputting the absolute posture angle, and is provided by using a microprocessor (CPU), a program for a general-purpose computer, etc. A posture angle processing apparatus 310 that includes the absolute posture estimation device 301 and a dip angle estimation and determination module 110 is provided as a processing module. And in the posture angle processing apparatus 310, the signal output by the dip angle estimation and determination module 110 is employed as a signal indicating that the absolute posture angle that is obtained and output by the absolute posture angle estimation device 301 is reliable.

Figure 4:
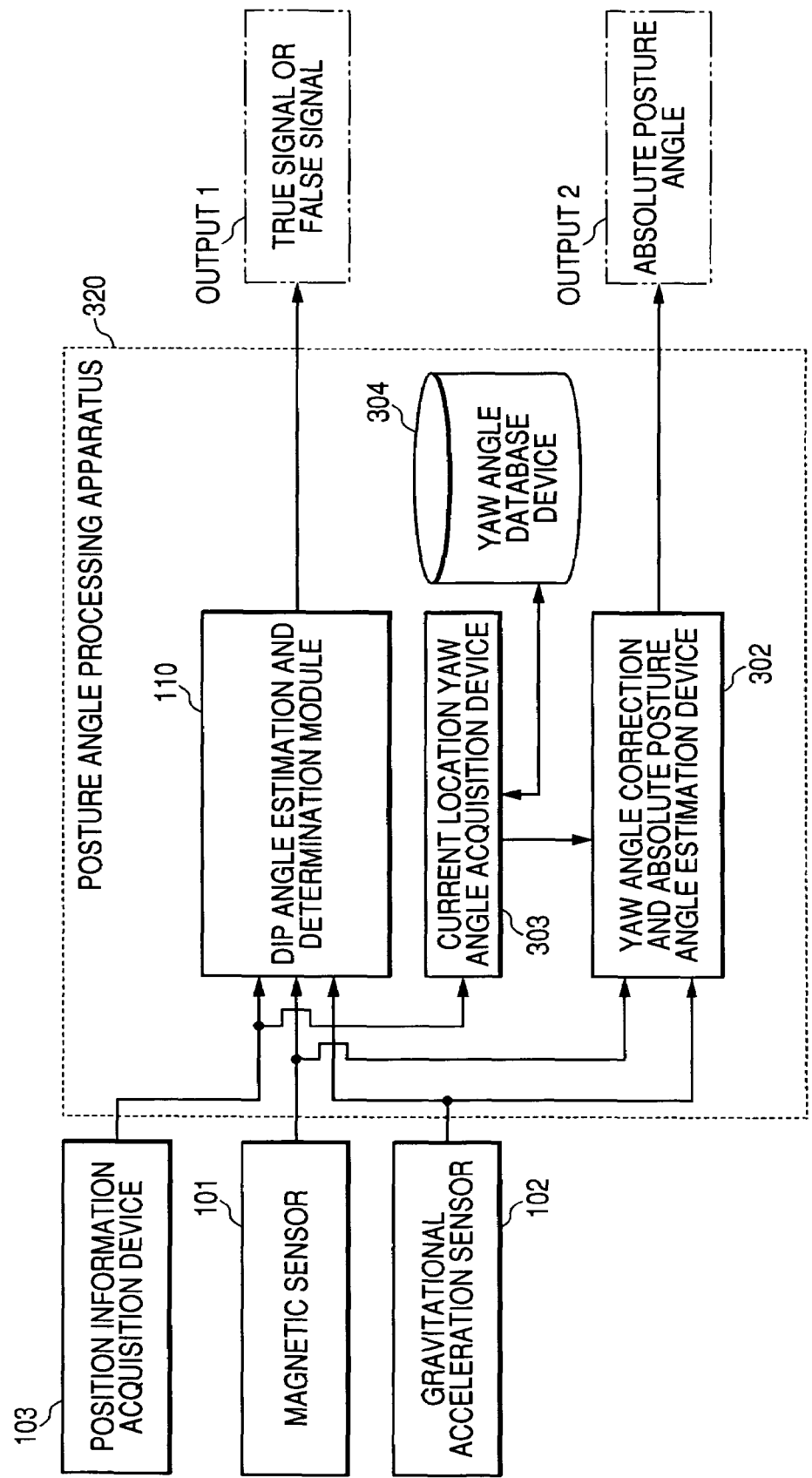
FIG. 4 is a block diagram showing a fourth aspect of the present invention.

FIG. 4 is a block diagram showing a fourth aspect of the present invention. In the fourth aspect shown in FIG. 4, the horizontal plane is obtained, based on gravitational acceleration vectors for three axes acquired by a gravitational acceleration sensor 102; magnetic vectors for three axes obtained by a magnetic sensor 101 are regarded as a geomagnetic vector; a current location yaw angle acquisition device 303 obtains the yaw angle for the geomagnetic vector, based on the current location obtained by a position information acquisition device 103; and a yaw angle correction and absolute posture angle estimation device 302 obtains the absolute posture angle, based on the yaw angle, the geomagnetic vector and the horizontal plane. The current location yaw angle acquisition device 303 includes a yaw angle database device 304 for obtaining a yaw angle, based on the absolute location. The yaw angle is uniquely defined in accordance with an absolute location on earth, and a yaw angle database used to acquire a yaw angle at each point (absolute position) is constructed by referring, for example, to a geomagnetic map issued by the Geographical Survey Institute.

Data representing a correlation of the absolute position (e.g., the latitude and the longitude) and a yaw angle at that position are stored in the yaw angle database device 304. Based on the absolute position obtained by the position information acquisition device 103, the current location yaw angle acquisition device 303 acquires, from the yaw angle database device 304, a yaw angle corresponding to the absolute location. The current location yaw angle acquisition device 303 converts the absolute location obtained from the position information acquisition device 103 into a general-purpose expression form (e.g., a latitude and longitude description) for the position, issues an inquiry to the yaw angle database device 304, while employing the expression form as a key, and obtains as a reply the yaw angle for the current location. This device is provided by using a special operation circuit or a microprocessor (CPU), a program for a general-purpose computer, etc. The yaw angle database device 304 is a device that includes a database wherein absolute locations and corresponding yaw angles are stored in correlation with each other, and a mechanism for comparing and extracting these data. The yaw angle database device 304 is provided by using a storage medium, such as a magnetic disk or an optical disk, on which yaw angle database data are stored, a special operation circuit or a microprocessor (CPU) that obtains a geomagnetic dip angle by using an absolute location as a key, a program for a general-purpose computer, etc. A table shown in FIG. 36, wherein absolute locations and yaw angles are entered in correlation with each other, is employed, for example, as the form for the data to be stored.

The yaw angle correction and the absolute posture angle estimation device 302 are provided by a microprocessor (a CPU), a program for a general-purpose computer, etc. A posture angle processing apparatus 320 in this aspect is constituted as a processing module, and includes a dip angle estimation and determination module 110, the current location yaw angle acquisition device 303 and the yaw angle correction and absolute posture angle estimation device 302. In the posture angle processing apparatus 320, a signal output by the dip angle estimation and determination module 110 is used as a signal indicating whether the absolute posture angle that is obtained and output by the yaw angle correction and absolute posture angle estimation device 302 is reliable.

Figure 5:
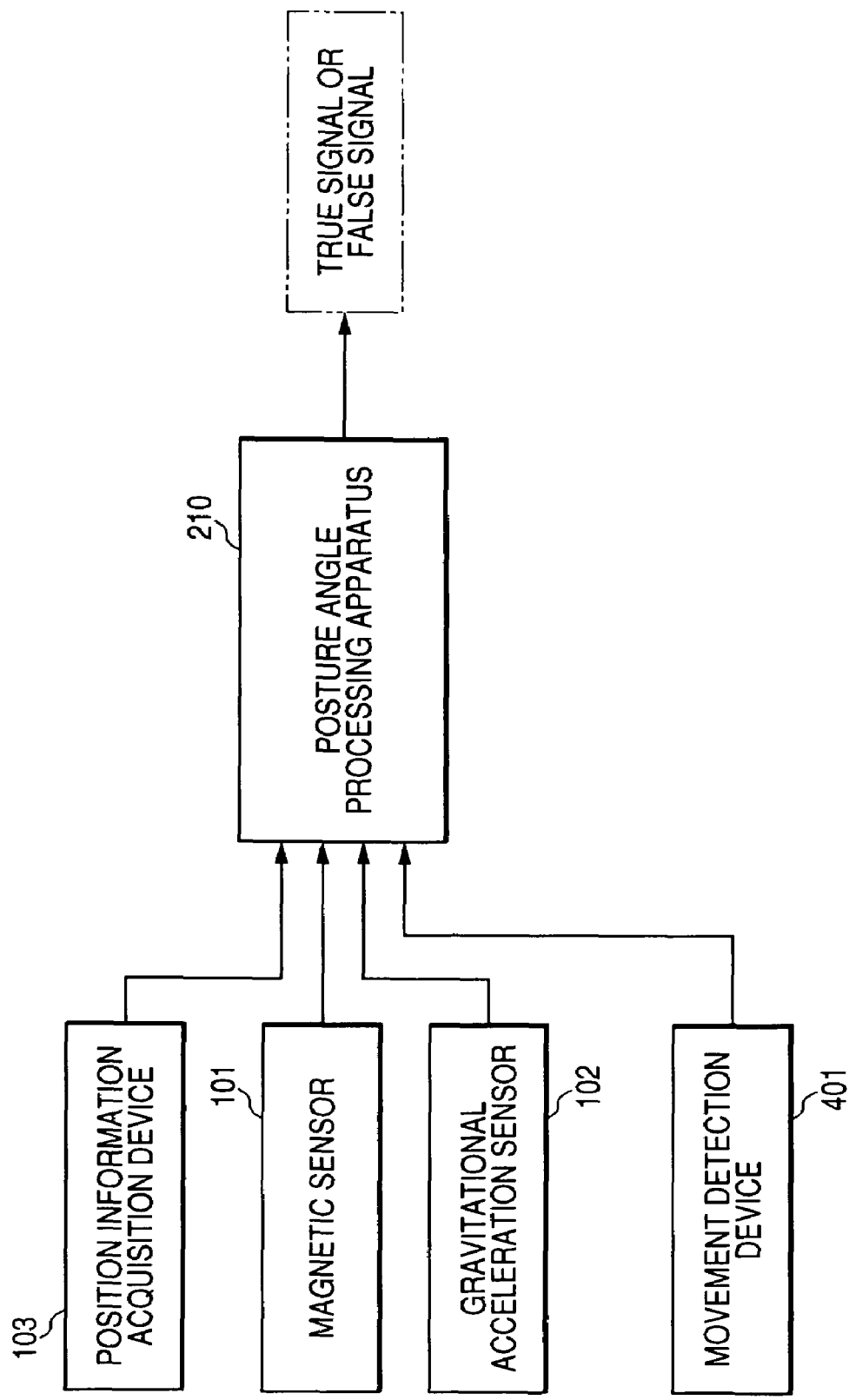
FIG. 5 is a block diagram showing a fifth aspect of the present invention.

FIG. 5 is a block diagram showing a fifth aspect of the present invention. In the aspect shown in FIG. 5, the movement detection device 201 in the second aspect in FIG. 2 is replaced by a walking detection device 401. The walking detection device 401 employs an acceleration sensor, mounted at the waist of a walking person, that detects walking by measuring changes in acceleration in the vertical direction or in the direction of travel. As another configuration, the walking detection device 401 employs an angular velocity sensor, mounted at the waist of a walking person, that detects walking by measuring changes in angular velocity in the direction of the pitch or the yaw.

Figure 6:
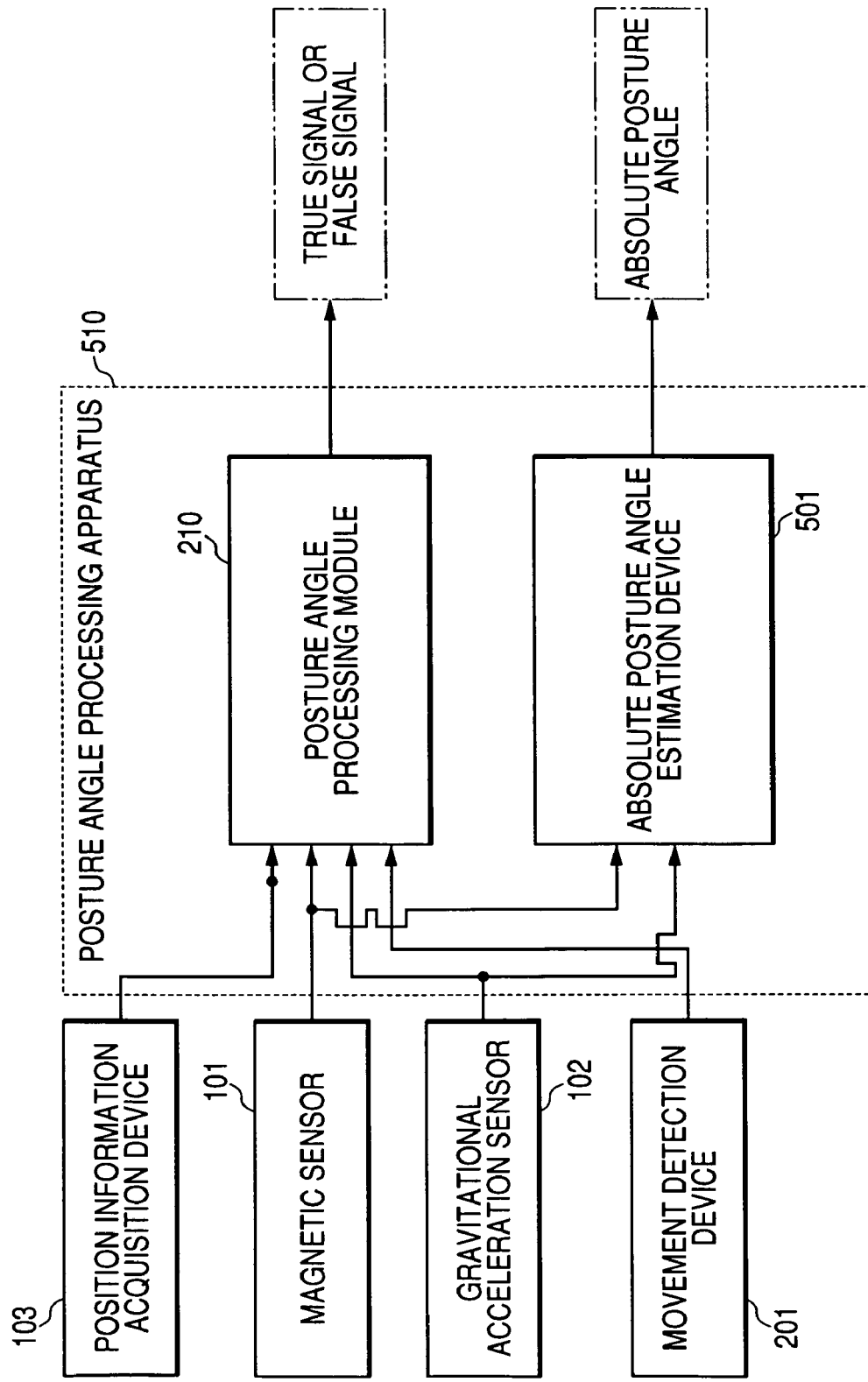
FIG. 6 is a block diagram showing a sixth aspect of the present invention.

FIG. 6 is a block diagram showing a sixth aspect of the present invention. In the aspect shown in FIG. 6, the horizontal plane is obtained in accordance with gravitational acceleration vectors for three axes acquired by a gravitational acceleration sensor 102, while magnetic vectors for three axes obtained by a magnetic sensor 101 are regarded as geomagnetic vectors, and a current absolute posture angle is calculated, based on the horizontal plane and the geomagnetic vectors. An absolute posture angle estimation device 501 is a device for performing an operation for calculating an absolute posture angle and for outputting the absolute posture angle, and is provided by using an operation circuit or a microprocessor (a CPU), a program for a general-purpose computer, etc. A posture angle processing apparatus 510 in this aspect is constituted as a processing module, and includes a posture angle processing module 210 and the absolute posture angle estimation device 501. A signal output by the posture angle processing module 210 is used as a signal indicating whether the absolute posture angle that is obtained and output by the absolute posture angle estimation device 501 is reliable.

Figure 7:
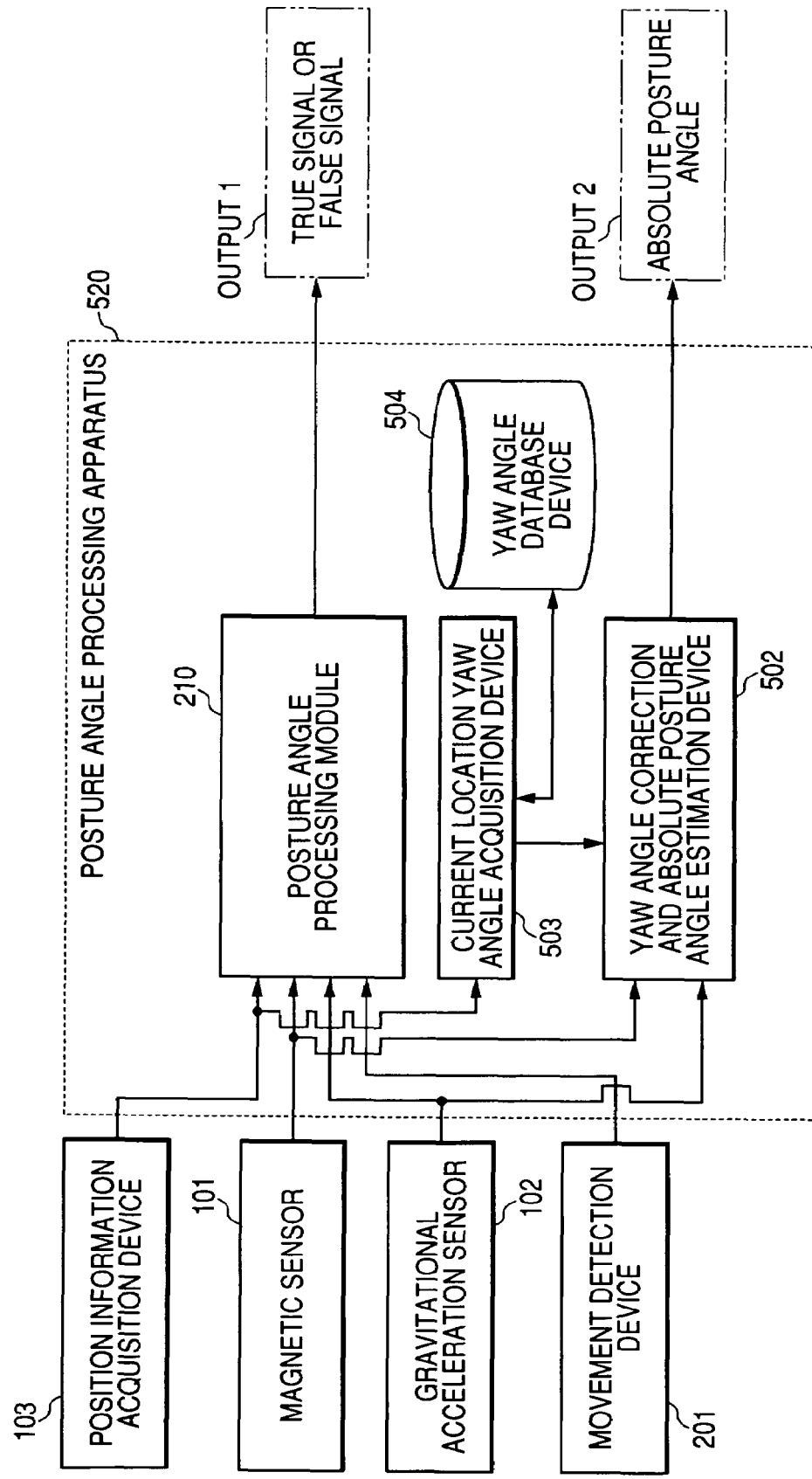
FIG. 7 is a block diagram showing a seventh aspect of the present invention.

FIG. 7 is a block diagram showing a seventh aspect of the present invention. In the aspect shown in FIG. 7, the horizontal plane is obtained in accordance with gravitational acceleration vectors for three axes obtained by a gravitational acceleration sensor 102; magnetic vectors obtained by a magnetic sensor 101 are regarded as a geomagnetic vector along three axes; a current location yaw angle acquisition device 503 obtains the yaw angle for the geomagnetic vector, based on the current location obtained by a position information acquisition device 103; and a yaw angle correction and absolute posture angle estimation device 502 obtains the absolute posture angle, based on the yaw angle, the geomagnetic vector and the horizontal plane. The current location yaw angle acquisition device 503 includes a yaw angle database device 504. Data representing a correlation of absolute locations (e.g., the latitudes and the longitudes) and yaw angles at corresponding locations are stored in the yaw angle data base device 504. Based on an absolute location obtained from the position information acquisition device 103, the current location yaw angle acquisition device 503 acquires, from the yaw angle database device 504, a yaw angle corresponding to the absolute location. The yaw angle correction and absolute posture angle estimation device 502 is provided by a microprocessor (a CPU), a program for a general-purpose calculator, etc. A posture angle processing apparatus 520 in this aspect is constituted as a processing module, and includes the current location yaw angle acquisition device 503 and the yaw angle correction and absolute posture angle estimation device 502. A signal output by the posture angle processing module 210 is used as a signal indicating whether the absolute posture angle that is obtained and output by the yaw angle correction and absolute posture angle estimation device 502 is reliable.

Figure 8:
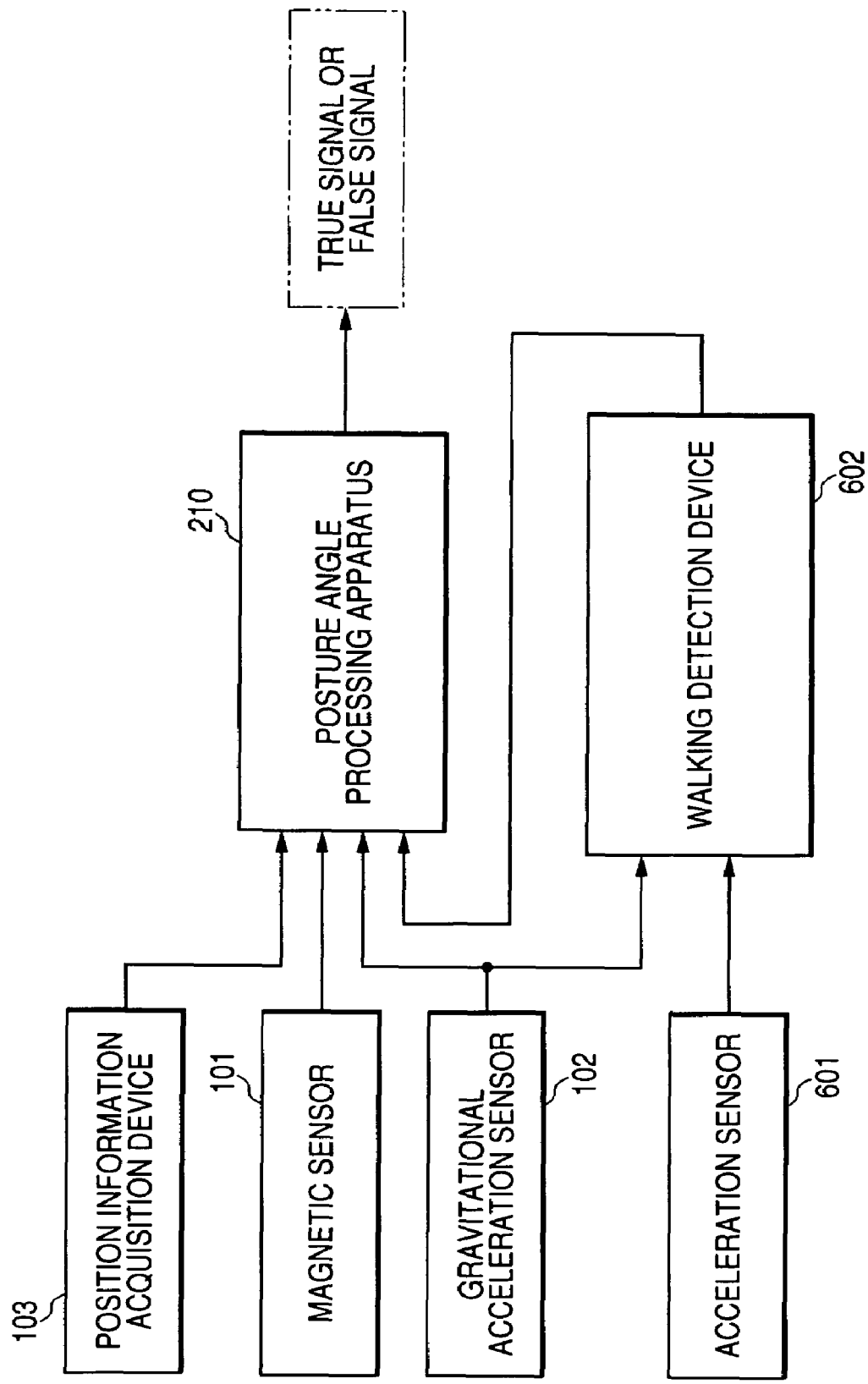
FIG. 8 is a block diagram showing an eighth aspect of the present invention.

FIG. 8 is a block diagram showing an eighth aspect of the present invention. In the aspect shown in FIG. 8, the walking detection device 401 in the fifth aspect in FIG. 5 is replaced by a walking detection device 602 that detects walking by using a gravitational acceleration vector obtained by a gravitational acceleration sensor 102 and an acceleration vector obtained by an acceleration vector 601. Therefore, as the configuration for an apparatus, the acceleration sensor 601 and the walking detection device 602 are provided. The walking detection device 602 is provided by using a set consisting of a microprocessor (aCPU) and a processing program for detecting walking.

Figure 9:
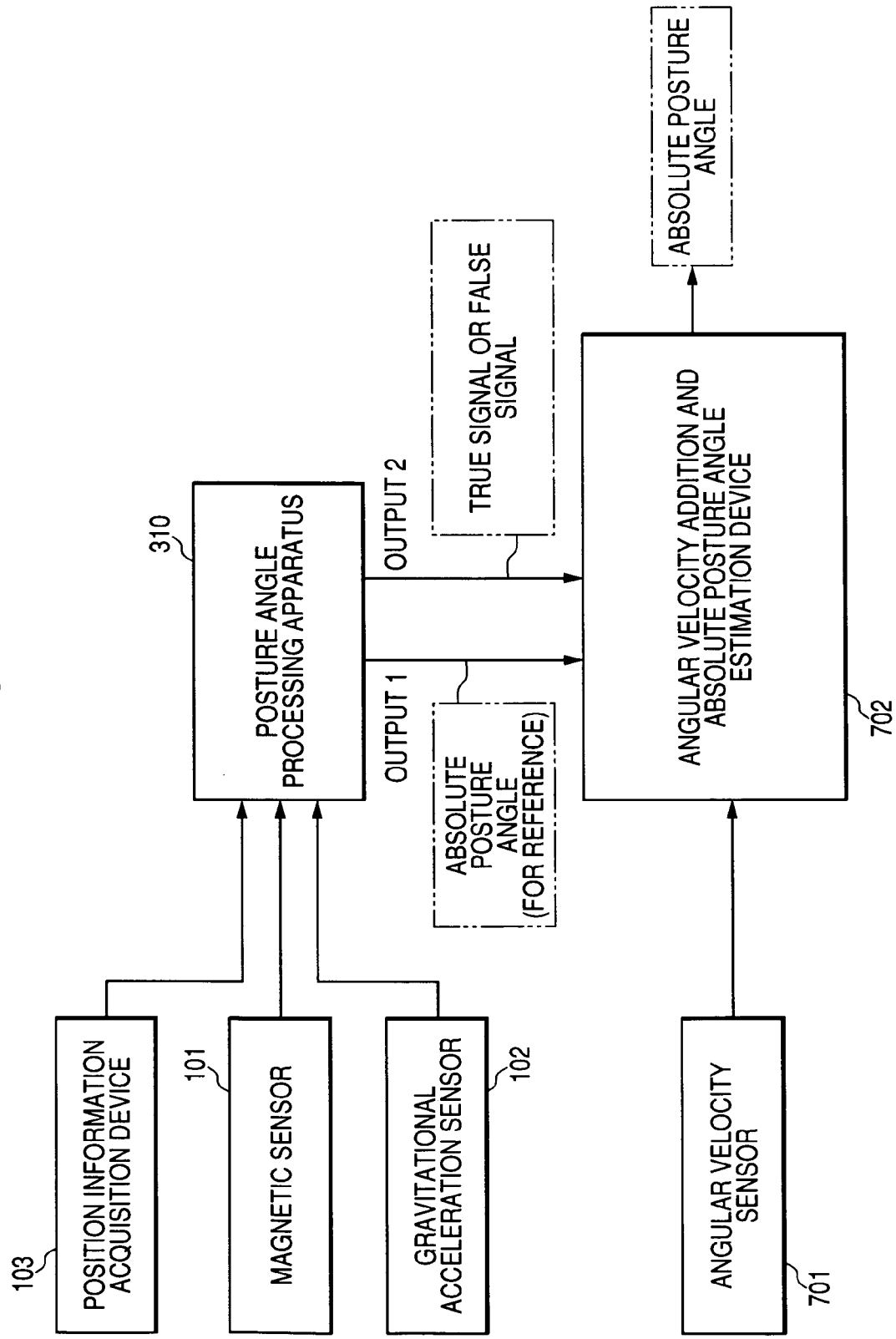
FIG. 9 is a block diagram showing a ninth aspect of the present invention.

FIG. 9 is a block diagram showing a ninth aspect of the present invention. In the aspect shown in FIG. 9, an angular velocity sensor 701 and an angular velocity addition and absolute posture angle estimation device 702 are provided in addition to the configuration for the third aspect (FIG. 3), or the configuration for the fourth aspect (FIG. 4). The angular velocity sensor 701 measures an angular velocity vector along three axes at an object to be measured, and is provided by using, for example, three gyro sensors ENC-03J marketed by Murata MFG. Co., Ltd. The angular velocity addition and absolute posture angle estimation device 702 receives an absolute posture angle (output 1) that is output as a reference by a posture angle processing apparatus 310 (or a posture angle processing apparatus 320), and a signal (output 2: a true signal or a false signal) indicating whether the absolute posture signal is reliable, and outputs the current absolute posture angle. When the signal for output 2 is a true signal, the angular velocity addition and absolute posture angle estimation device 702 designates, as the reference absolute posture angle, an absolute posture angle obtained, based on the output 1, and outputs this angle as the current absolute posture angle. When the signal for output 2 is a false signal, based on an angular velocity vector measured by the angular velocity sensor 701, the angular velocity addition and absolute posture angle estimation device 702 updates the last reference absolute posture angle that is output as output 1 (i.e., is output as output 1 while a true signal is being output as output 2), and outputs the updated results as the current absolute posture angle.

Figure 10:
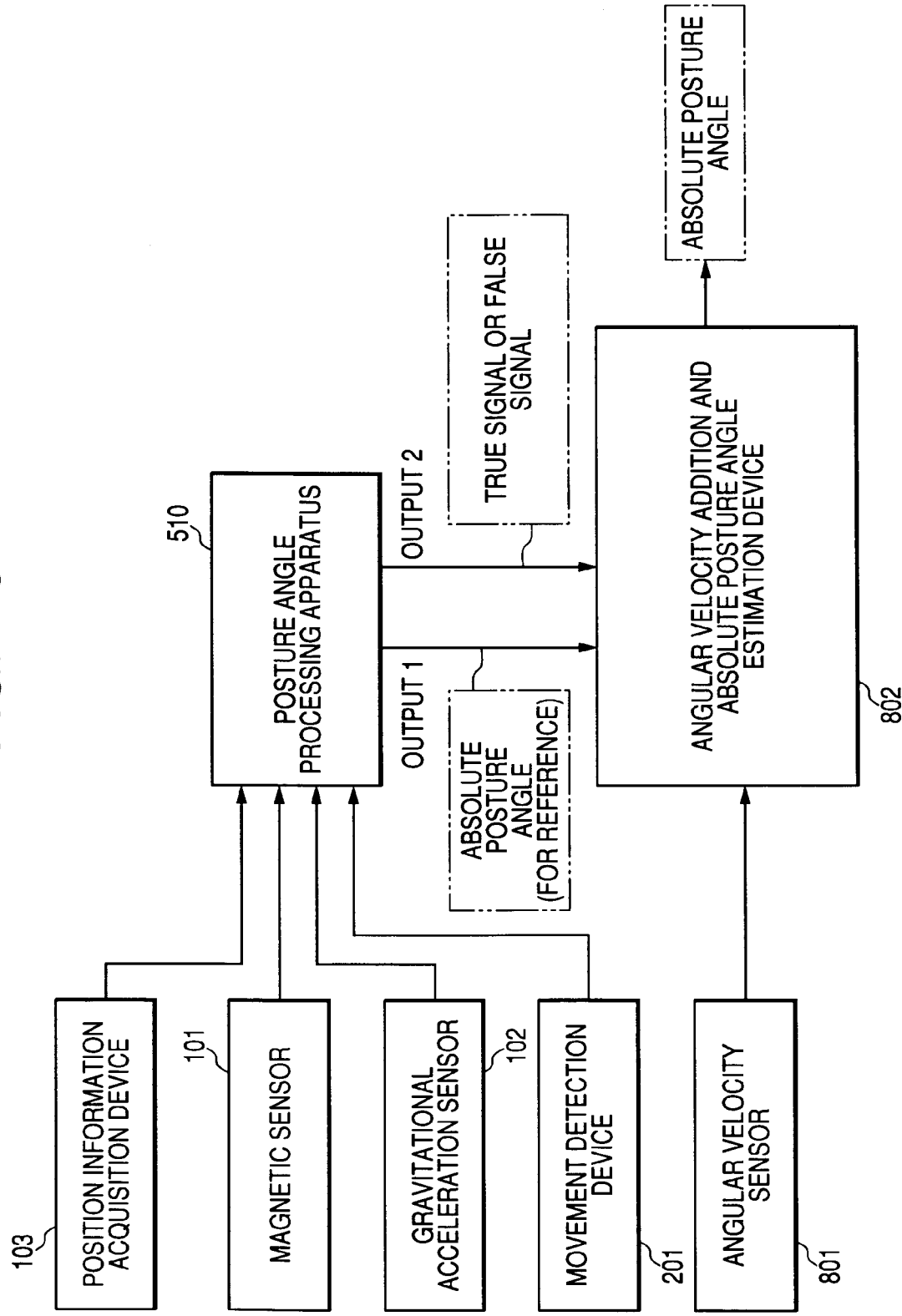
FIG. 10 is a block diagram showing a tenth aspect of the present invention.

FIG. 10 is a block diagram showing a tenth aspect of the present invention. For an apparatus in the tenth aspect in FIG. 10, an angular velocity sensor 801 and an angular velocity addition and an absolute posture angle estimation device 802 are provided in addition to the configuration for the sixth aspect (FIG. 6), or the configuration for the seventh aspect (FIG. 7). The angular velocity sensor 801 measures an angular velocity vector along three axes at an object to be measured. The angular velocity addition and absolute posture angle estimation device 802 receives the absolute posture angle (output 1) that is output, as a reference, by a posture angle processing apparatus 510 (or a posture angle processing apparatus 520), and a signal (output 2: a true signal or a false signal) indicating whether the absolute posture angle (output 1) is reliable, and outputs the current absolute posture angle. When the signal for output 2 is a true signal, the angular velocity addition and absolute posture angle estimation device 702 designates, as a reference absolute posture angle, the absolute posture angle obtained, based on output 1, and outputs this angle as the current absolute posture angle. When the signal for output 2 is a false signal, based on an angular velocity vector measured by the angular velocity sensor 801, the angular velocity addition and absolute posture angle estimation device 702 updates the last reference absolute posture angle that is output as output 1 (i.e., is output as output 1 while a true signal is being output as output 2), and outputs the updated results as the current absolute posture angle.

Figure 11:
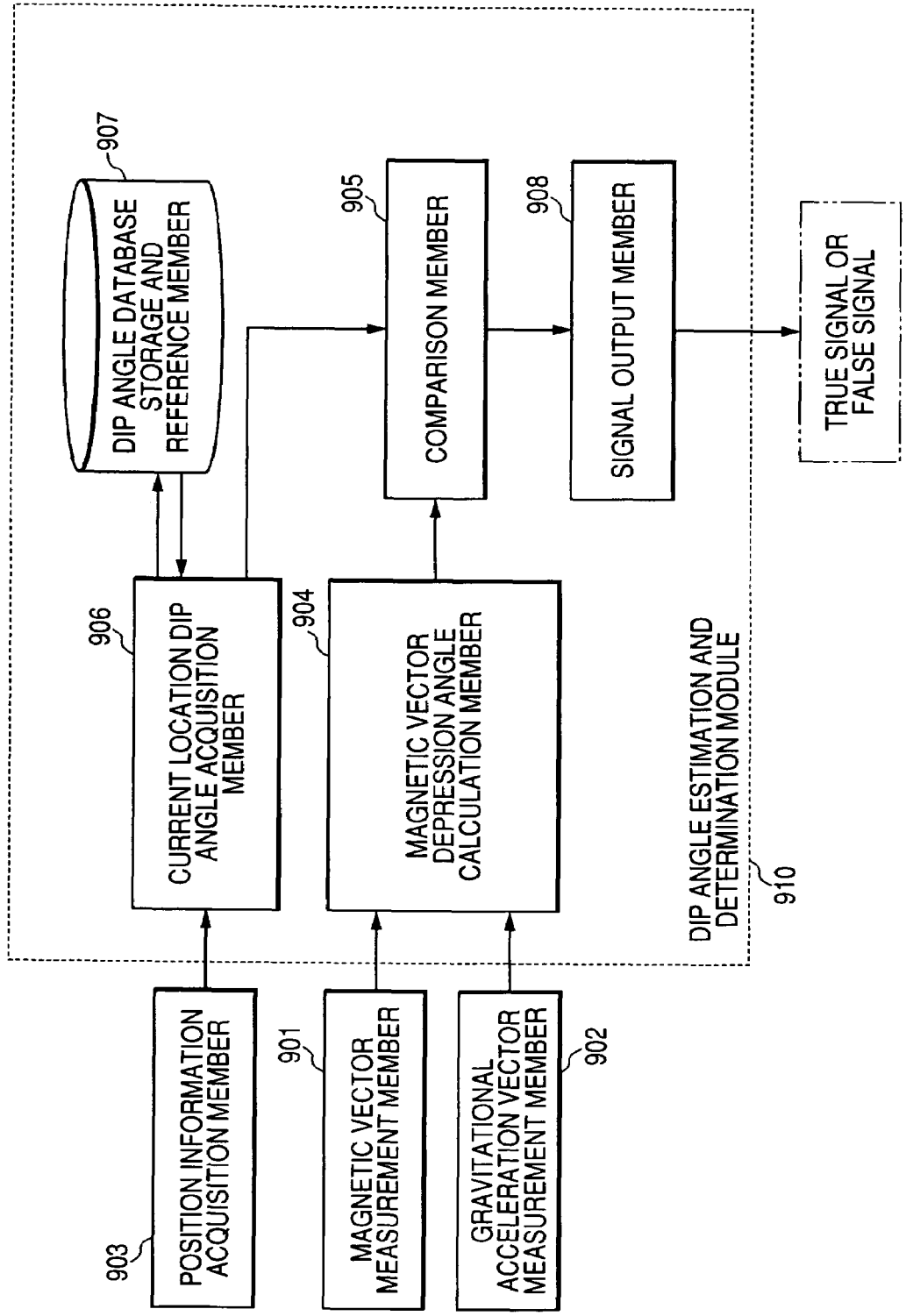
FIG. 11 is a block diagram showing an eleventh aspect of the present invention.

FIG. 11 is a block diagram showing an eleventh aspect of the present invention. In the aspect shown in FIG. 11, magnetic vector measurement member 901 is a member for measuring magnetic vectors for three axes at an object to be measured, and is provided by using, for example, magnetic sensor HMC1052 or HMC1051Z, marketed by Honeywell Corp., and a microcomputer that includes an A/D conversion port for reading the sensor data. Gravitational acceleration vector measurement member 902 is a device for measuring gravitational acceleration vectors for three axes at an object to be measured, and is provided by using, for example, acceleration sensor ADXL202E, marketed by Analog Devices Corp., a microprocessor (CPU) that includes an A/D conversion port for reading the sensor data and a filter program for the digital data.

Position information acquisition member 903 is a device for obtaining the absolute location of an object to be measured, and is provided by using, for example, a mechanism that obtains the latitude and the longitude of the current location by employing a device that receives a signal from a GPS satellite. Magnetic vector depression angle calculation member 904 employs magnetic vectors for three axes, which are obtained by the magnetic vector measurement member 901, and gravitational acceleration vectors for three axes, which are obtained by the gravitational acceleration vector measurement member 902, to calculate angles formed by the magnetic vectors and the gravitational acceleration vectors, and employs the obtained results to calculate the horizontal plane and the magnetic vector. These members are provided by using an operation circuit or a microprocessor (a CPU) that includes a program, a program for a general-purpose computer, etc. Current location dip angle acquisition member 906 is provided by using an operation circuit or a microprocessor (a CPU) that includes a program, a program for a general-purpose computer, etc. The program for the operation circuit converts the absolute location obtained by the position information acquisition member 903 into a general-purpose expression form (e.g., a latitude and longitude expression) that represents position data, issues an inquiry to dip angle database storage and reference member 907 while using this expression form as a key, and obtains, as a reply, the geomagnetic dip angle for the current location. The dip angle database storage and reference member 907 is a device that includes a database wherein absolute locations and dip angles at the corresponding locations are entered in correlation with each other, and a mechanism for the comparison and extraction of these data. The dip angle database storage and reference member 907 is provided by using a storage medium, such as a magnetic disk or an optical disk, on which the data are stored, an operation circuit or a microprocessor (a CPU) that includes a program for obtaining a geomagnetic dip angle by using an absolute location as a key, a program for a general-purpose calculator, etc. As previously described, a table form shown in FIG. 36, for example, is employed as the form for the data to be stored. Comparison member 905 is a member for comparing a dip angle received from current location dip angle acquisition member 906 with a depression angle received from the magnetic vector depression angle calculation member 904. Output member 908 is processing a member for outputting a true signal when an error, as a result of the comparison performed by the comparison member 905, is within a predetermined range, and for outputting a false signal in other cases. These members are provided by using an operation circuit or a microprocessor (CPU) that includes a comparison and conditional branching operation and an output function, a program for a general-purpose computer, etc.

The processes performed by the individual member in this aspect are also performed by the program for the general-purpose computer. The processing performed by such a program will now be described.

Figure 12:
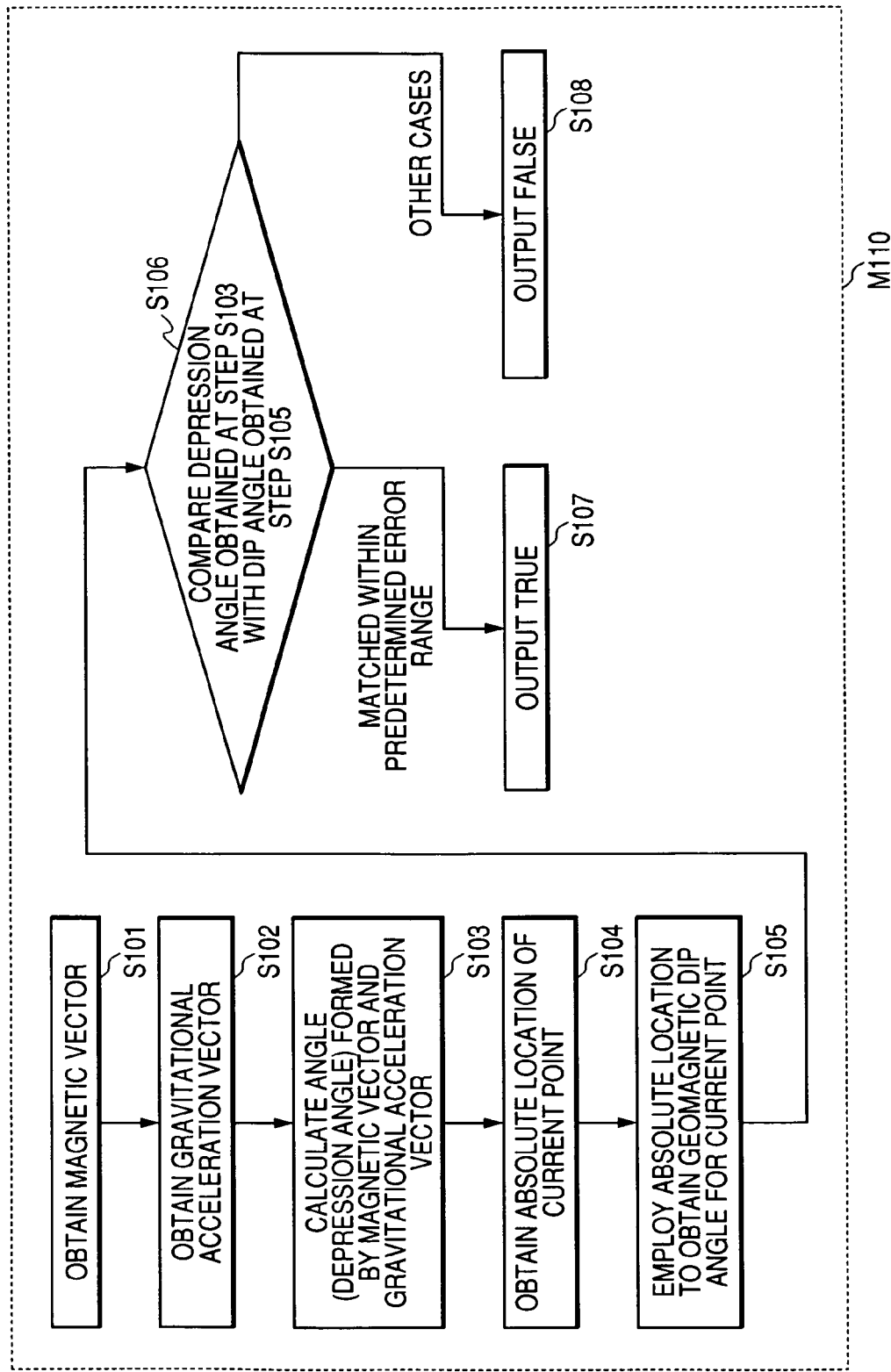
FIG. 12 is a flowchart showing the processing corresponding to the eleventh aspect.

A flowchart shown in FIG. 12 shows the processing corresponding to the eleventh aspect. During this processing, first, at step S101, magnetic vectors for three axes are obtained, at step S102, gravitational acceleration vectors for three axes are obtained, and then, at step S103, an angle formed by the magnetic vector and the gravitational acceleration vector is calculated. The angle formed by the magnetic vector and the gravitational acceleration vector is the depression angle for the magnetic vector relative to the horizontal plane. Thus, at step S104, the current absolute location is obtained, at step S105, based on the obtained absolute location, the geomagnetic dip angle is obtained for the current location, and at step S106, the depression angle and the geomagnetic dip angle are compared. When an error between the two is within a predetermined range, program control is shifted to step S107, and in other cases, program control is shifted to step S108.

When program control is shifted to step S107, true (a true signal) is issued as the output of a module M110. When program control is shifted to step S108, false (a false signal) is issued as the output of the module M110.

Figure 13:
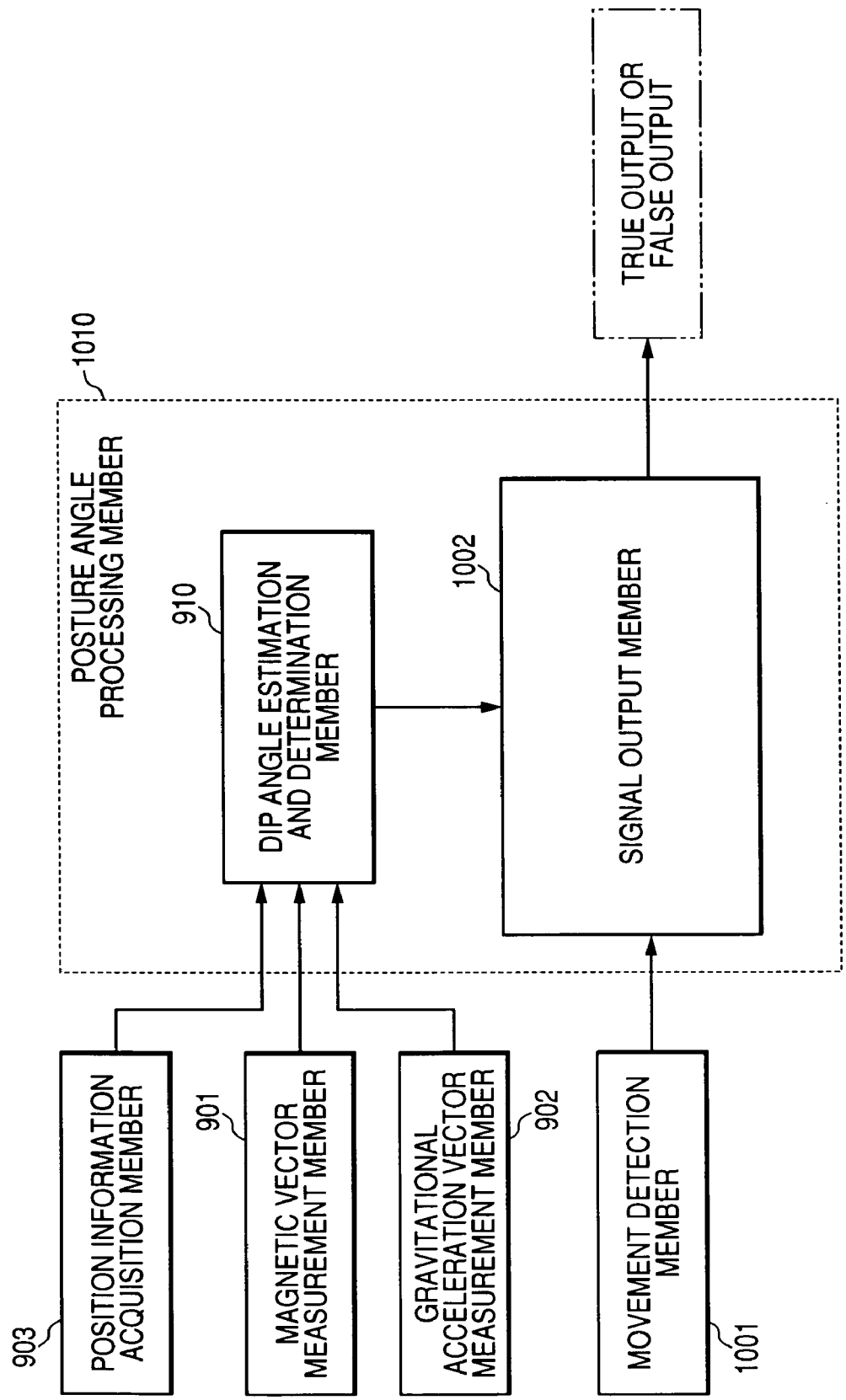
FIG. 13 is a block diagram showing a twelfth aspect of the present invention.

FIG. 13 is a block diagram showing a twelfth aspect of the present invention. In the aspect shown in FIG. 13, movement detection member 1001 is a member for detecting whether an object to be measured is moving. In order to detect whether the object to be measured is moving, when the object is an automobile, a speedometer is employed, or when the object is an airplane, a time-sequence change (a moving vector between the previous location and time and the current location and time) of absolute location information obtained from a GPS satellite is acquired, or a ground speedometer is employed, or when the object is a human being, a pedometer is employed. Signal output member 1002 outputs a true signal when the movement detection member 1001 is detecting the continuous movement of the object to be measured, and at the same time, dip angle estimation and determination member 910 continuously outputs a true signal, or outputs a false signal in other cases. The signal output member 1002 is provided by using an operation circuit or a microprocessor (a CPU) that includes a comparison and conditional branching operation program and a temporary storage device, a program for a general-purpose computer, etc.

The processes performed by the individual member in this aspect are also provided by a program for a general-purpose computer. The processing performed by such a program will now be described.

Figure 14:
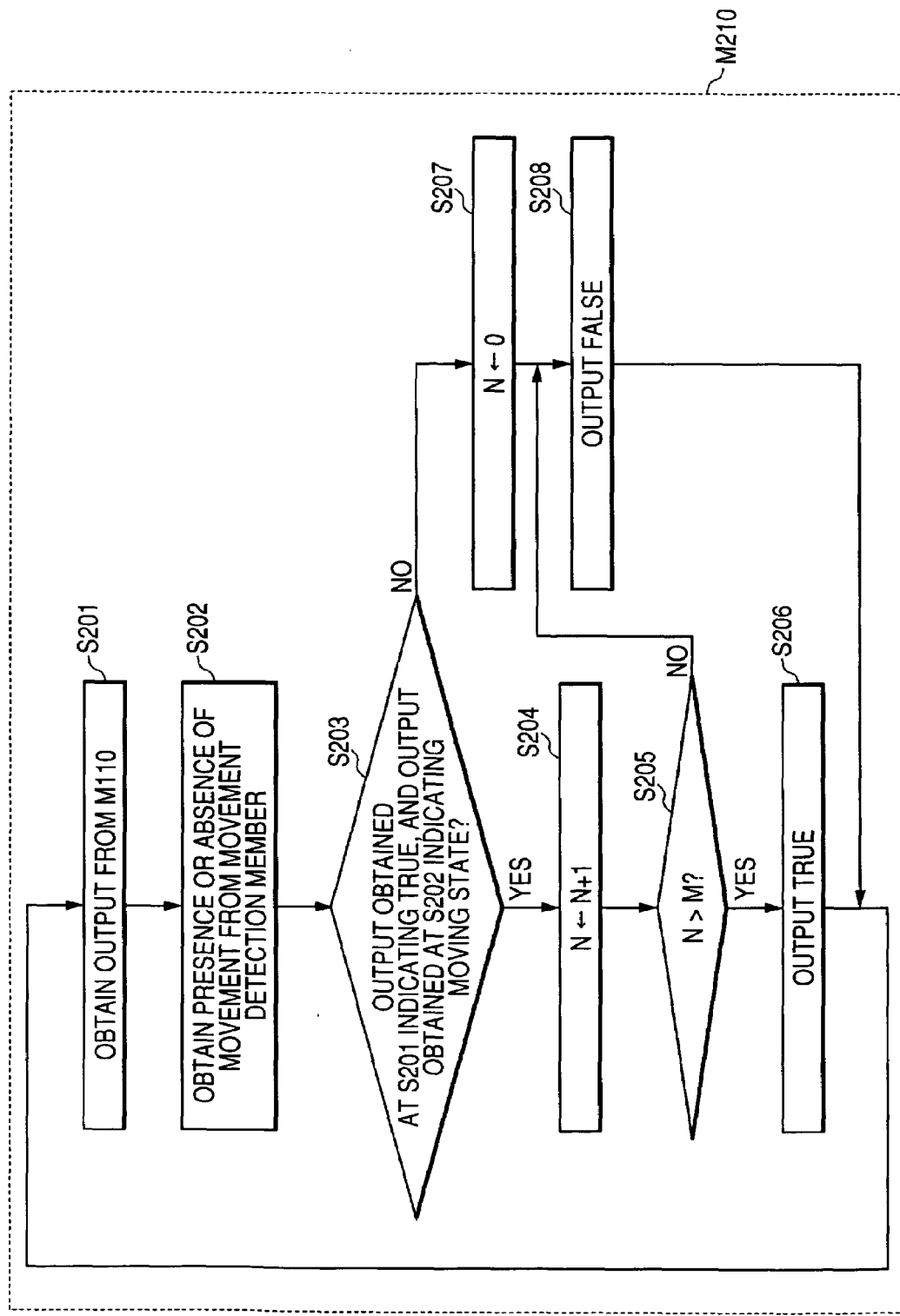
FIG. 14 is a flowchart showing the processing corresponding to the twelfth aspect.

The flowchart in FIG. 14 shows the processing corresponding to the twelfth aspect. During this processing, first, at step S201, the output (true or false) of the module M110 in FIG. 12 is obtained, and at step S202, the moving state is obtained from the movement detection member. Then, at step S203, when the output obtained at step S201 is true and the moving state obtained at step S202 indicated the object to be measured is currently moving, program control is shifted to step S204. In other cases, program control is shifted to step S207.

At step S204, a variable N, representing the count whereat program control was sequentially shifted to step S204, is incremented by one. At step S205, a predesignated lower limit count M and the variable N are compared, and when the variable N is greater, program control is shifted to step S206. In other cases, program control is shifted to step S208. Then, at step S207, the variable N is set to 0. At step S206, true is issued as the output of a module M 210, and at step S208, false is issued as the output of the module M210.

Figure 15:
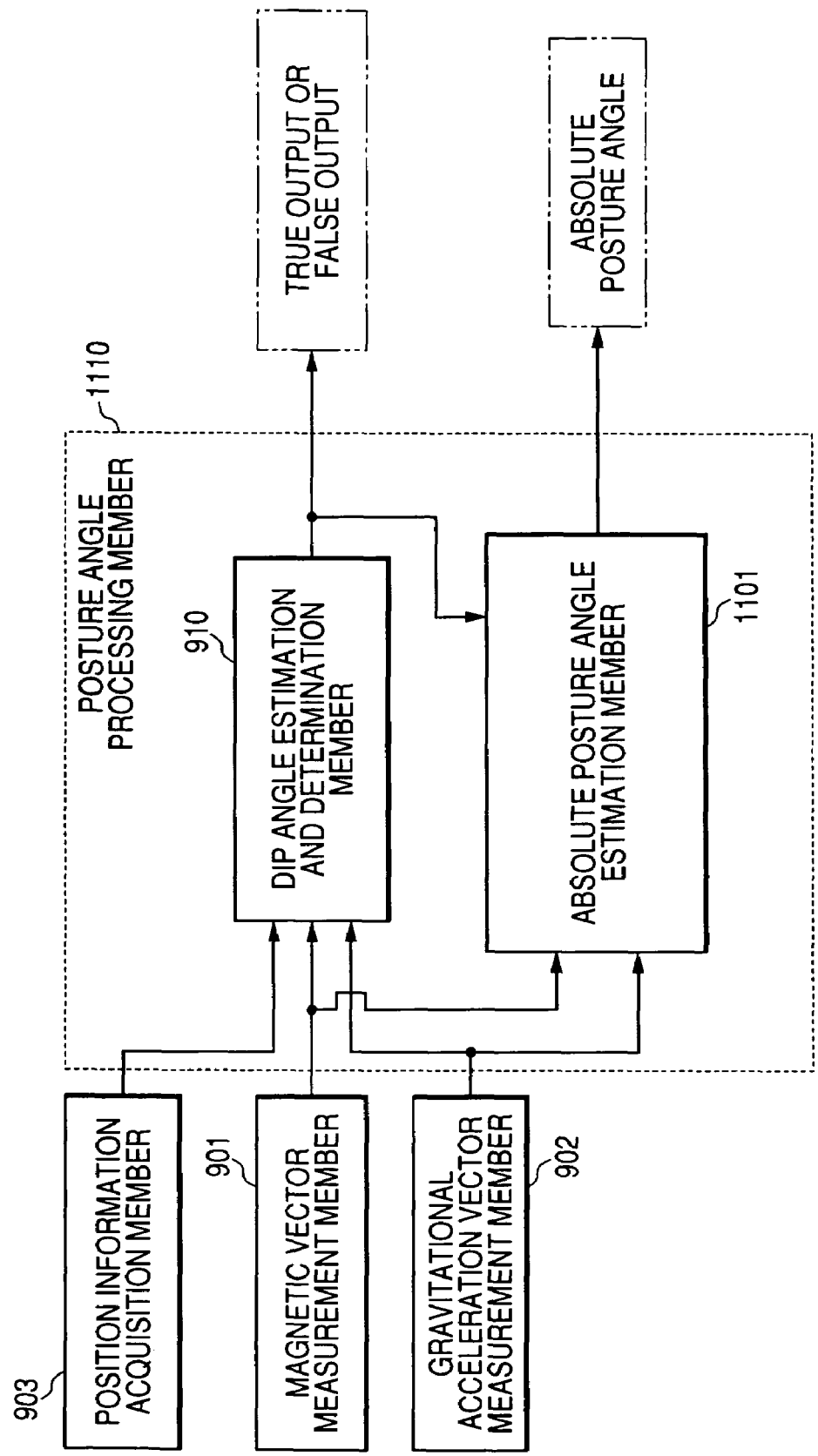
FIG. 15 is a block diagram showing a thirteenth aspect of the present invention.

FIG. 15 is a block diagram showing a thirteenth aspect of the present invention. In the aspect shown in FIG. 15, the horizontal plane is obtained, based on gravitational acceleration vectors for three axes obtained by gravitational acceleration vector measurement member 902, magnetic vectors for three axes obtained by magnetic vector measurement member 901 are regarded as geomagnetic vectors, and the current absolute posture angle is calculated in accordance with the horizontal plane and the geomagnetic vectors. Absolute posture angle estimation member 1101 is processing a member for performing this calculation and outputting the results, and is provided by using a microprocessor (aCPU), a program for a general-purpose calculator, etc. In posture angle processing member 1110 in this aspect, the output of dip angle estimation and determination member 910 is employed as output indicating whether the absolute posture angle that is obtained and output by the absolute posture angle estimation member 1101 is reliable.

The processes performed by the individual member in this aspect can be also provided by a program for a general-purpose calculator. The processing performed by such a program will now be described.

Figure 16:
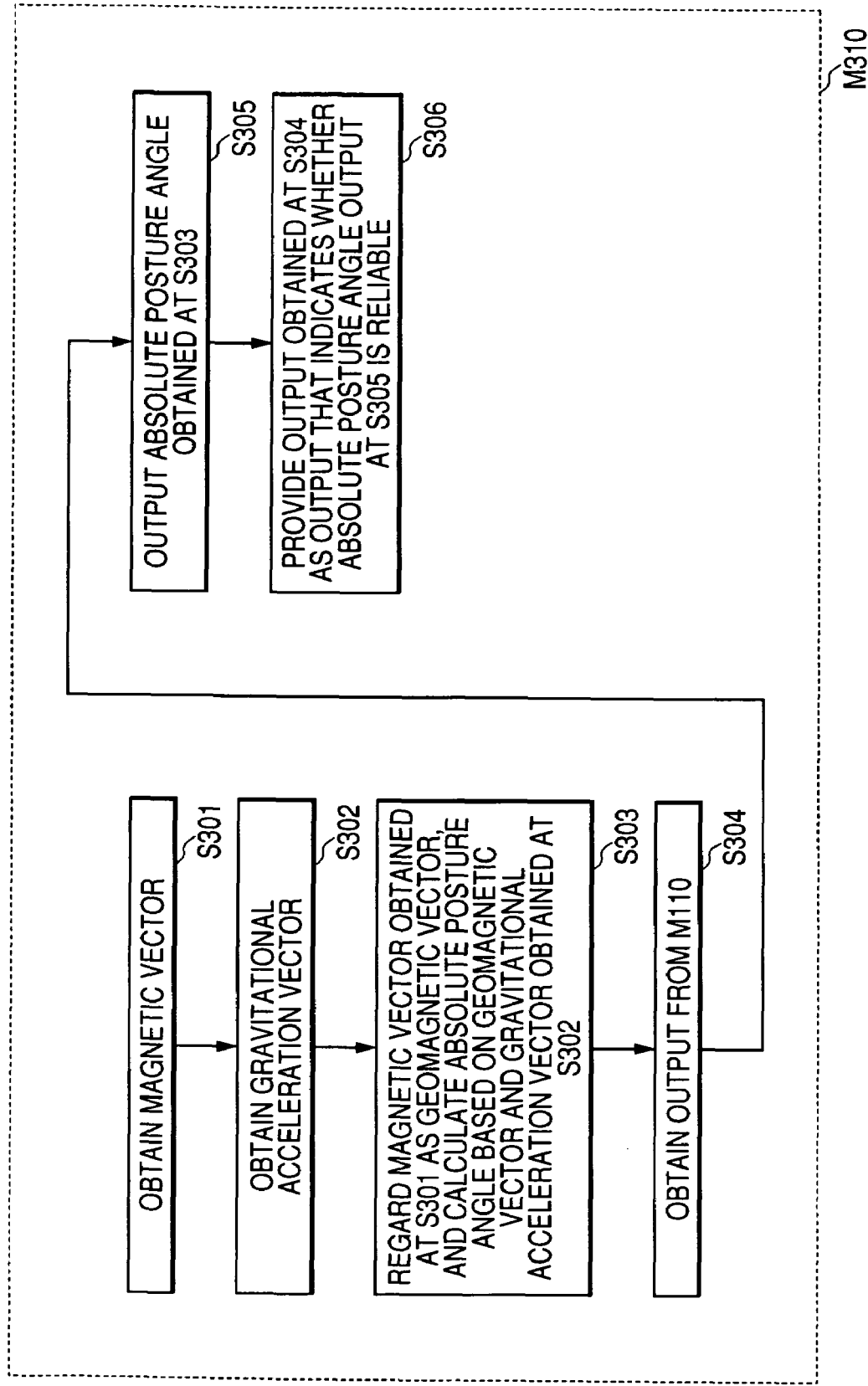
FIG. 16 is a flowchart showing the processing corresponding to the thirteenth aspect.

The flowchart in FIG. 16 shows the processing corresponding to the thirteenth aspect. During this processing, first, at step S301, magnetic vectors for three axes are obtained, and at step S302, gravitational acceleration vectors for three axes are obtained. Then, at step S303, the magnetic vectors obtained at step S301 are regarded as geomagnetic vectors, and the current absolute posture angle is calculated in accordance with the gravitational acceleration vector obtained at step S302 and the geomagnetic vectors (the magnetic vectors). Following this, at step S304, the output (true or false) of a module M110 is obtained, and at step S305, the absolute posture angle obtained during the process at step S303 is output as output 1 for a module M310. Sequentially, at step S306, the output (true or false) obtained at step S304 is regarded as a signal (a true signal or a false signal) indicating whether the absolute posture angle output at step S305 is reliable, and is output as output 2 of the module M310.

Figure 17:
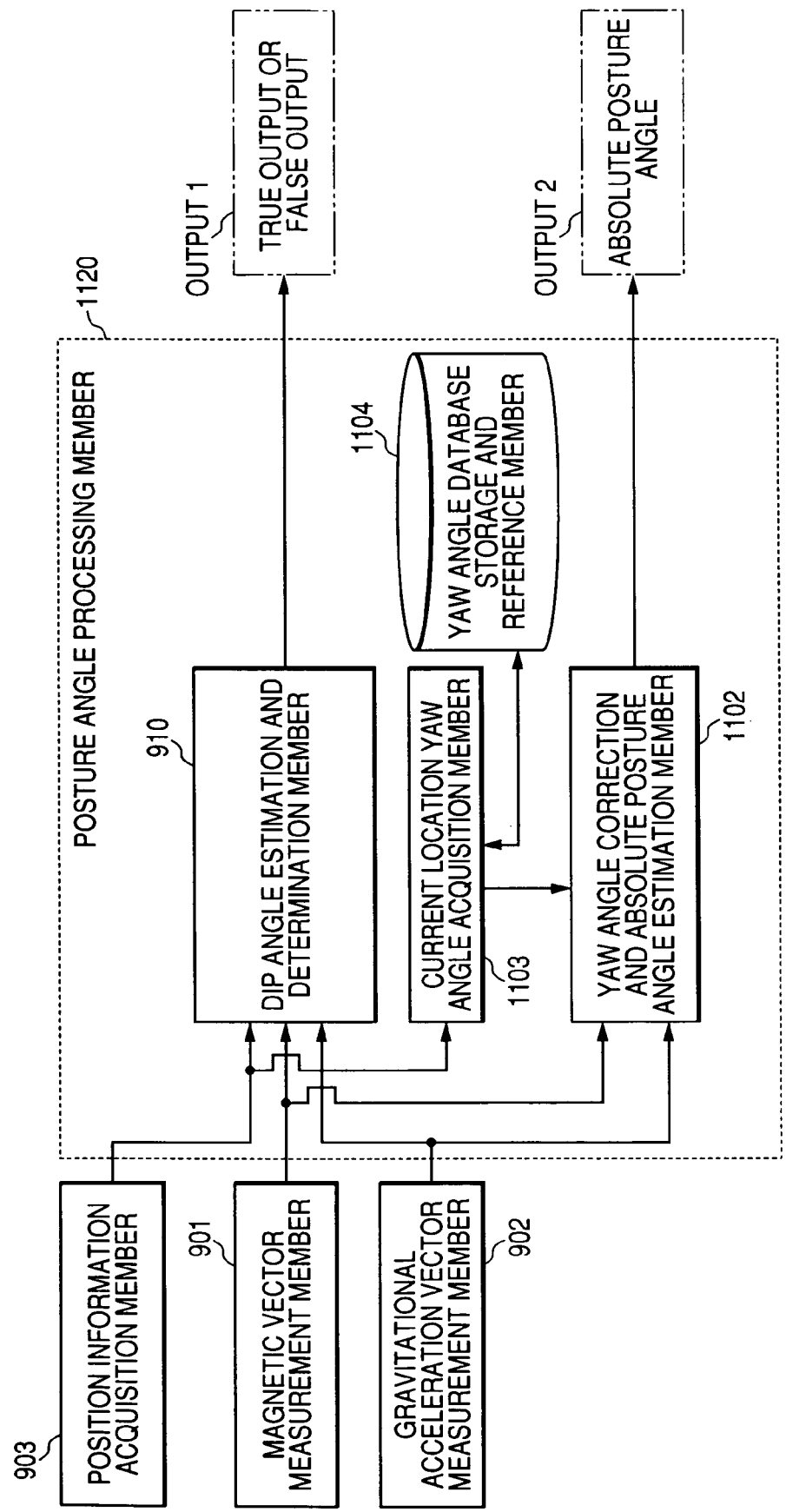
FIG. 17 is a block diagram showing a fourteenth aspect of the present invention.

FIG. 17 is a block diagram showing a fourteenth aspect of the present invention. In the aspect in FIG. 17, the horizontal plane is obtained in accordance with gravitational acceleration vectors for three axes obtained by gravitational acceleration vector measurement member 902; magnetic vectors for three axes obtained by magnetic vector measurement member 901 are regarded as geomagnetic vectors; current location yaw angle acquisition member 1103 is employed to obtain the yaw angle for the geomagnetic vector, based on the current location obtained by position information acquisition member 903; and yaw angle correction and absolute posture angle estimation member 1102 is employed to obtain the absolute posture angle, based on the yaw angle, the geomagnetic vector and the horizontal vector. Therefore, the current location yaw angle acquisition member 1102 includes a yaw angle database storage and reference member 1104. It should be noted that the yaw angle is uniquely defined in accordance with an absolute location on earth. The yaw angle at each point can be obtained by referring, for example, to a geomagnetic map issued by the Geographical Survey Institute. Since data representing a correlation of the absolute location (e.g., the longitude and the latitude) and the yaw angle at the corresponding location are stored in the yaw angle database storage and reference member 1104, based on an absolute location received from the position information acquisition device 903, the current location yaw angle acquisition member 1103 extracts, from the yaw angle database storage and reference member 1104, the yaw angle corresponding to this absolute location. The yaw angle correction and absolute posture angle estimation member 1102 is provided by using, for example, a set consisting of a microprocessor (a CPU) and a program for a general-purpose computer. For posture angle processing member 1120 in this aspect, the output of the dip angle estimation and determination member 910 is used as the output indicating whether the absolute posture angle that is obtained and output by the yaw angle correction and absolute posture angle estimation member 1102 is reliable. The posture angle processing member 1120 is provided as a processing module.

The processes performed by the individual member in this aspect are also performed by a program for a general-purpose computer. The processing performed by such a program will now be explained.

Figure 18:
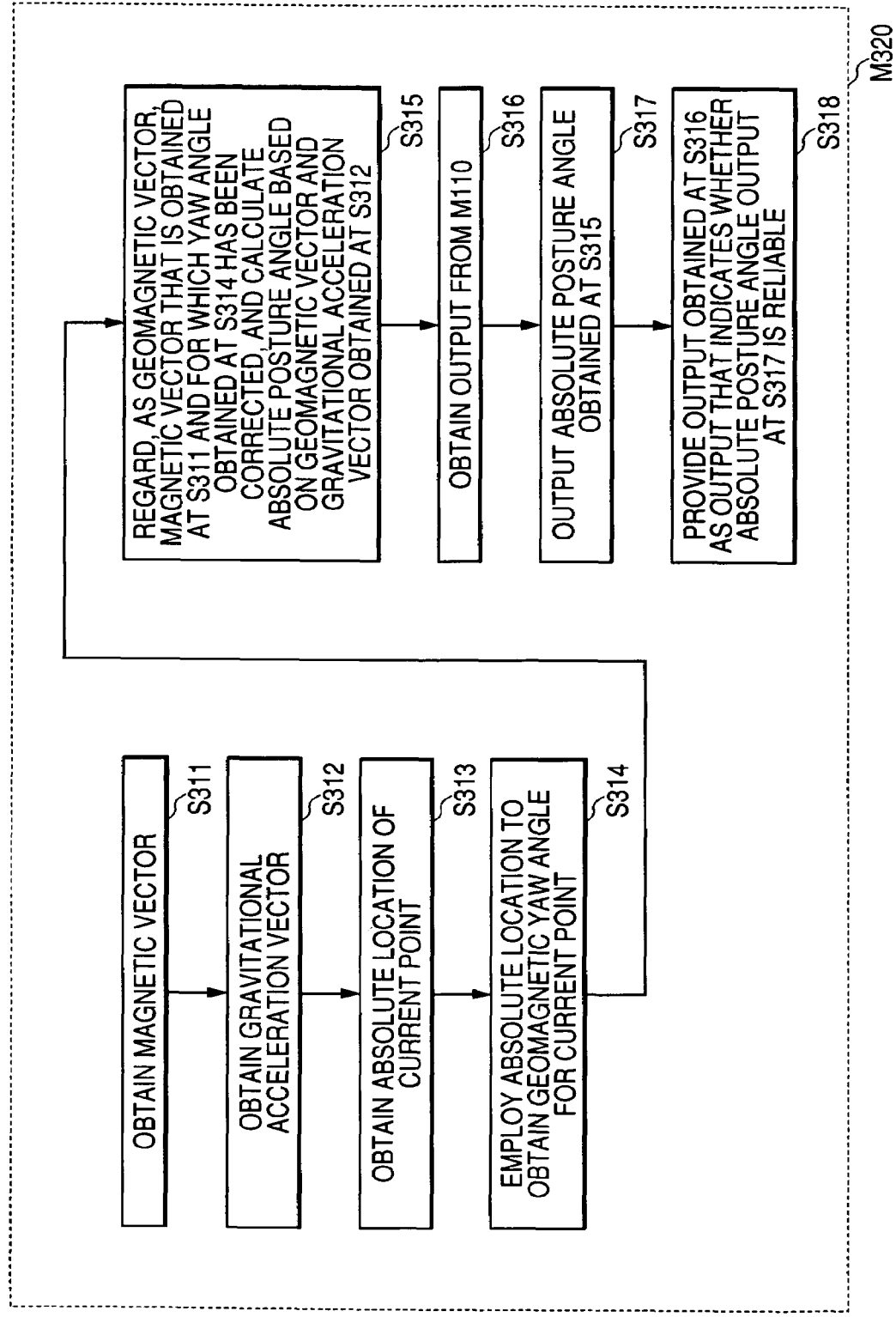
FIG. 18 is a flowchart showing the processing corresponding to the fourteenth aspect.

The flowchart in FIG. 18 shows the processing corresponding to the fourteenth aspect. During this processing, first, at step S311 magnetic vectors for three axes are obtained, at step S312 gravitational acceleration vectors for three axes are obtained, and at step S313 the absolute current location is obtained. Then, at step S314, the geomagnetic yaw angle for the current location is obtained, based on the absolute location acquired at step S313. Following this, at step S315, the yaw angle obtained at step S314 is corrected for the magnetic vector obtained at step S311, the corrected magnetic vector is regarded as the geomagnetic vector indicating the correct direction of north, and the current absolute posture angle is calculated, based on this magnetic vector and the gravitational acceleration vector obtained at step S312. At step S316, the output (true or false) of the module M110 (FIG. 12) is obtained, and at step S317, the absolute posture angle obtained at step S315 is output as output 1 of this processing module M320. At step S318, the output (true or false) obtained at step S316 is used as a signal indicating whether the absolute posture angle output at step S317 is reliable. That is, the output at step S316 is employed as output 2 of the processing module M320.

Figure 19:
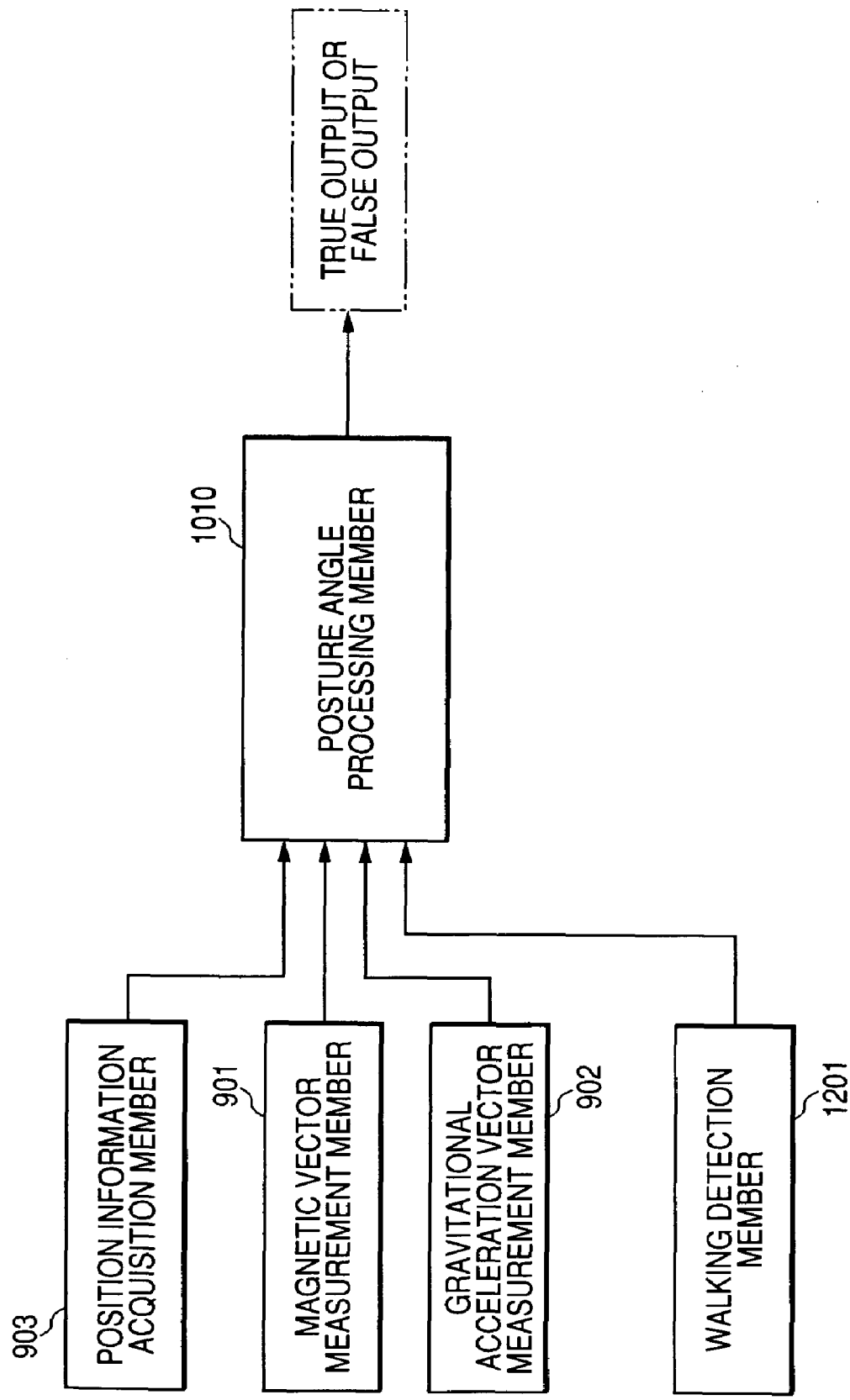
FIG. 19 is a block diagram showing a fifteenth aspect of the present invention.

FIG. 19 is a block diagram showing a fifteenth aspect of the present invention. In the aspect shown in FIG. 19, the movement detection member 1001 in the twelfth aspect in FIG. 13 is replaced by walking detection member 1201. The walking detection member 1201 employs an acceleration sensor attached, for example, at the waist of a walker and detects walking by measuring an acceleration change in either, or both, the vertical direction and the direction of travel, or employs an angular velocity sensor attached, for example, at the waist of a walker, and detects walking by measuring the angular velocity change in the direction of the pitch or yaw, and by comparing this with the typical time-sequence pattern created by walking.

The processes performed by the individual member in this aspect are also performed by a program for a general-purpose computer. The processing performed by such a program will now be described.

Figure 20:
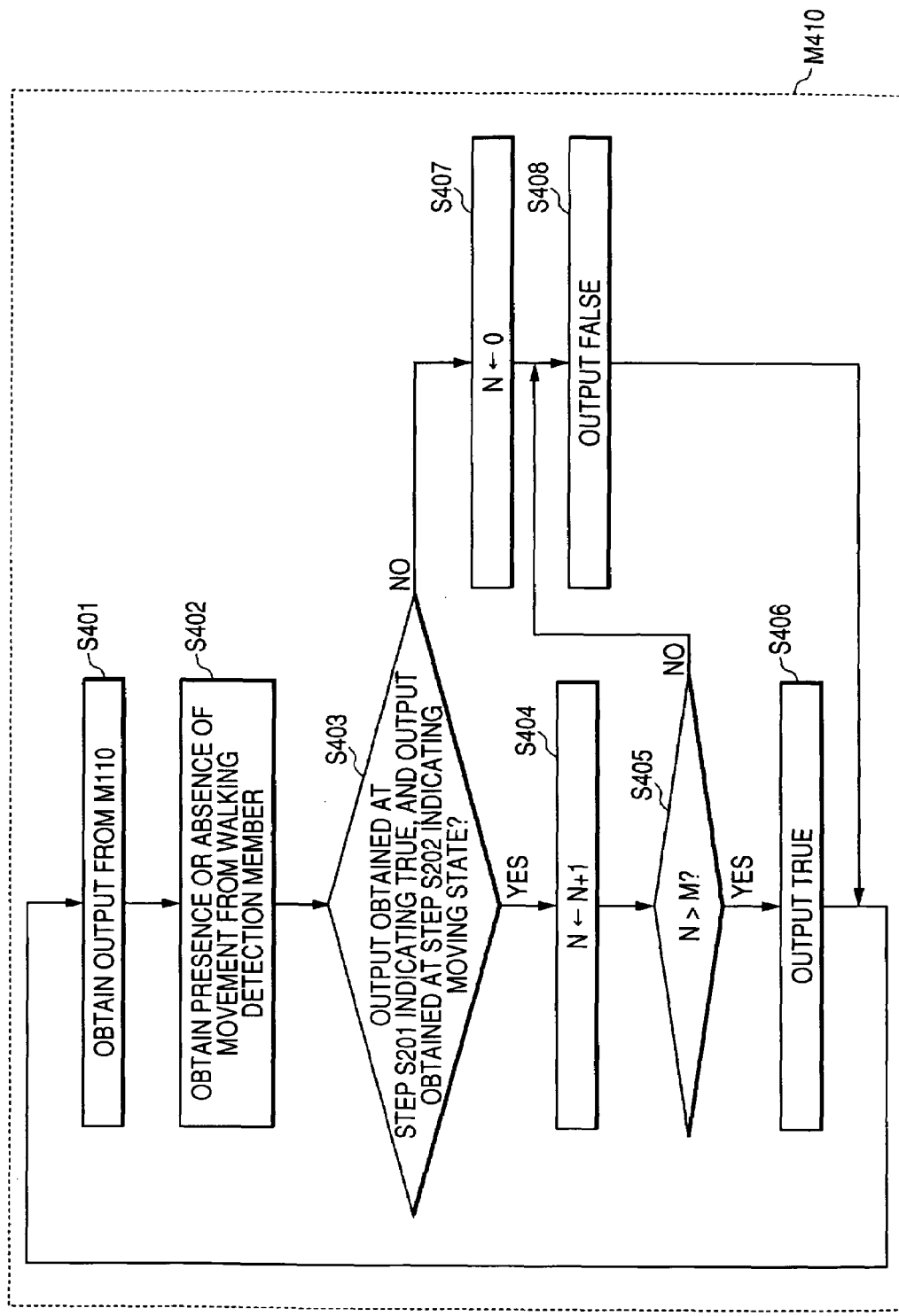
FIG. 20 is a flowchart showing the processing corresponding to the fifteenth aspect.

The flowchart shown in FIG. 20 shows the processing corresponding to the fifteenth aspect. During this processing, first, at step S401, the output (true or false) of the module M110 in FIG. 12 is obtained, and at step S402, the moving state is received from the walking detection member. Then, when, at step S403, the output obtained at step S401 indicates true and when the moving state obtained at step S402 indicates the object is currently moving, program control is shifted to step S404. In other cases, program control is shifted to step S407. At step S404, a variable N indicating the count whereat program control is sequentially shifted to step S404 is incremented by one. At step S405, a predesignated lower limit count M and the variable N are compared, and when the variable N is greater, program control is shifted to step S406. In other cases, program control is shifted to step S408. At step S407 whereat program control has been shifted from step S403, the variable N is set to 0. At step S406, true is issued as the output of this module M410, and at step S408, false is issued as the output of the module M410.

Figure 21:
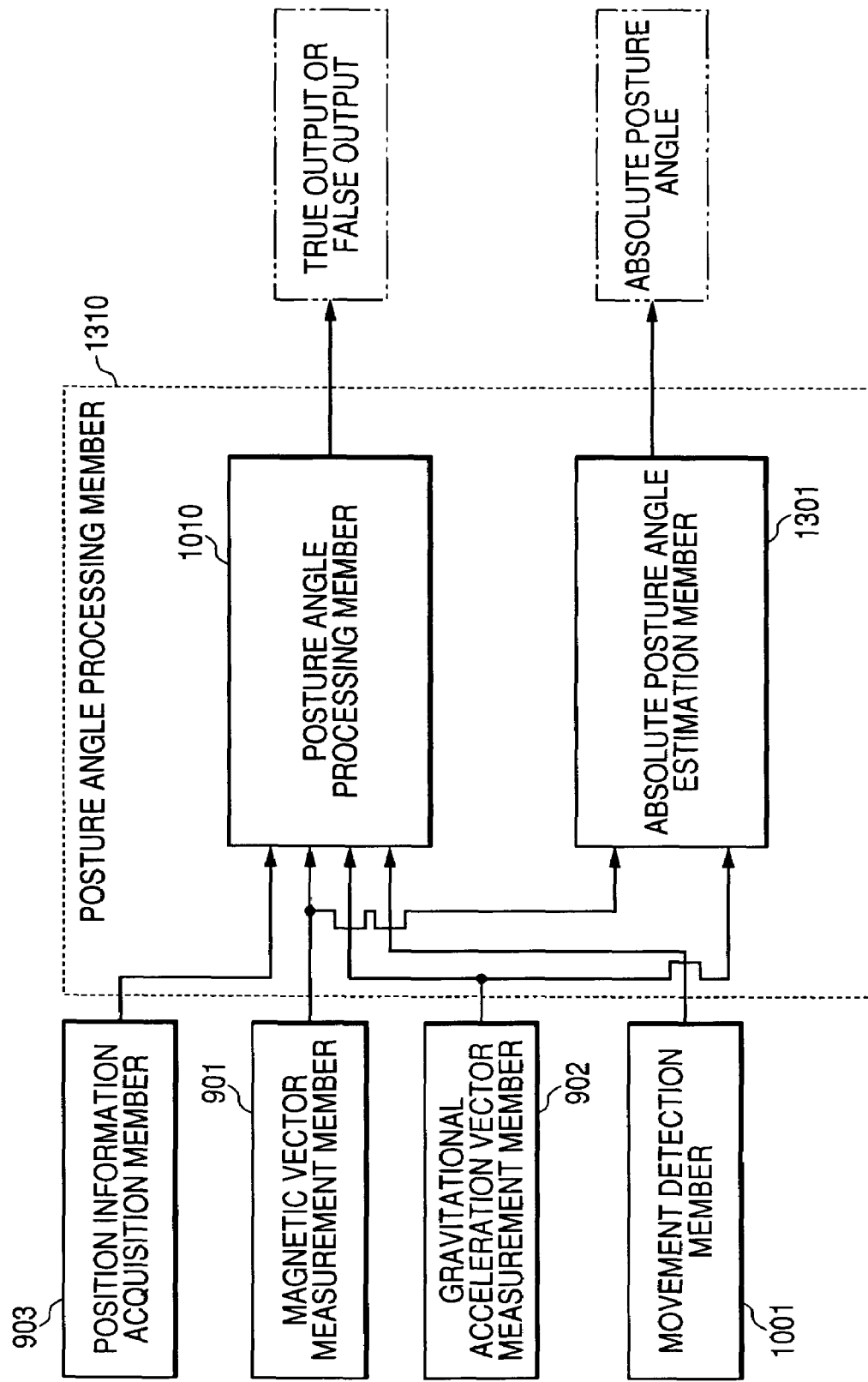
FIG. 21 is a block diagram showing a sixteenth aspect of the present invention.

FIG. 21 is a block diagram showing a sixteenth aspect of the present invention. In the aspect shown in FIG. 21, the horizontal plane is obtained in accordance with gravitational acceleration vectors for three axes obtained by gravitational acceleration vector measurement member 902: magnetic vectors for three axes obtained by magnetic vector measurement member 901 are regarded as geomagnetic vectors; and the current absolute posture angle is calculated, based on the horizontal plane and the geomagnetic vectors. Absolute posture angle estimation member 1301 is a member for performing this calculation and outputting the result, and is provided, for example, by using a set consisting of a microprocessor (CPU) and a program for a general-purpose computer. For processing member 1310 in this aspect, the output of processing member 1010 is employed as the output indicating whether the absolute posture angle that is obtained and output by the absolute posture angle estimation member 1301 is reliable.

The processes performed by the individual member in this aspect can also be performed by a program for a general-purpose computer. The processing performed by such a program will now be explained.

Figure 22:
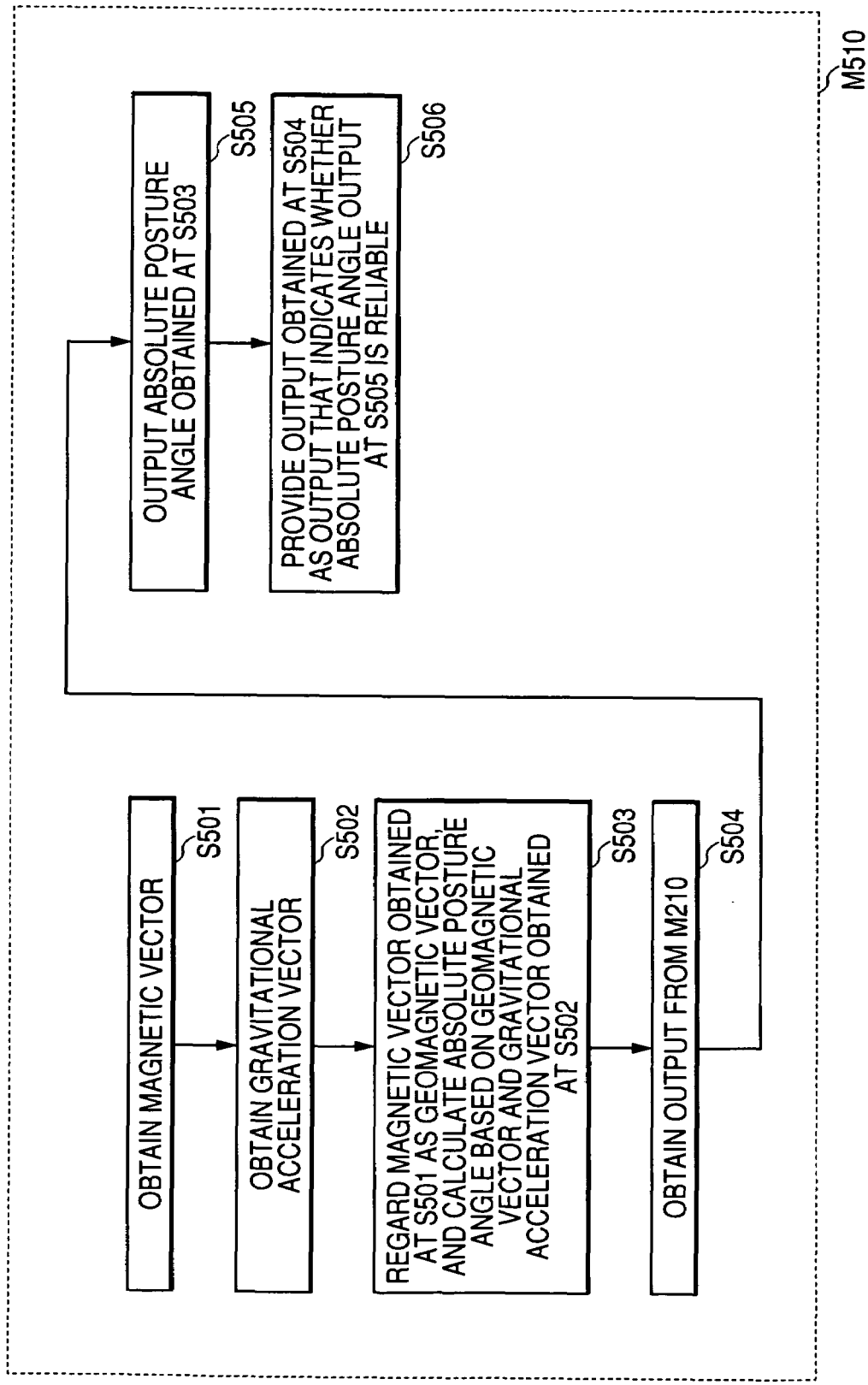
FIG. 22 is a flowchart showing the processing corresponding to the sixteenth aspect.

The flowchart in FIG. 22 shows the processing corresponding to the sixteenth aspect. During this processing, first, at step S501, magnetic vectors for three axes are obtained, and at step S502, gravitational acceleration vectors for three axes are obtained. At step S503, the magnetic vectors obtained at step S501 are regarded as geomagnetic vectors, and the current absolute posture angle is calculated, based on the geomagnetic vectors (the magnetic vectors) and the gravitational acceleration vectors obtained at step S502. At step S504, the output (true or false) of the module M210 is obtained. At step S505, the absolute posture angle obtained at step S503 is output as output 1 of this module M510. And at step S506, the output (true or false) obtained at step S505 is regarded as a signal (a true signal or a false signal) indicating whether the absolute posture signal output at step S505 is reliable, and this signal is output as output 2 of the module M510.

Figure 23:
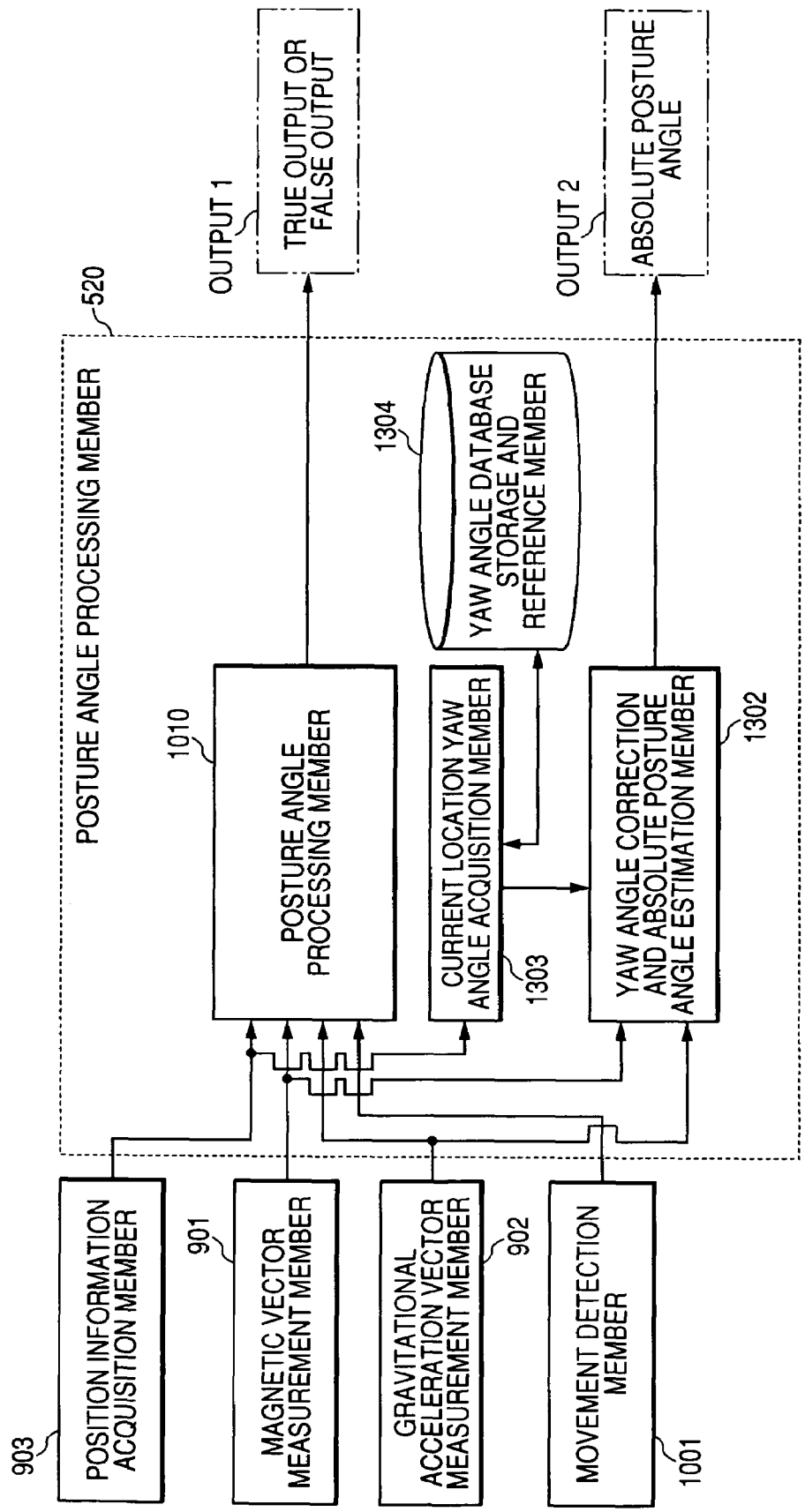
FIG. 23 is a block diagram showing a seventeenth aspect of the present invention.

FIG. 23 is a block diagram showing a seventeenth aspect of the present invention. In the aspect in FIG. 23, the horizontal plane is obtained, based on gravitational acceleration vectors for three axes acquired by gravitational acceleration vector measurement member 902; magnetic vectors for three axes obtained by magnetic vector measurement member 901 are regarded as geomagnetic vectors; current location yaw angle acquisition member 1303 is employed to obtain the yaw angle of the geomagnetic vector, based on the current location received from position information acquisition member 903; yaw angle correction and absolute posture angle estimation member 1302 is employed to calculate and output the absolute posture angle based on the yaw angle, the geomagnetic vector and the horizontal plane obtained based on the gravitational acceleration vector. The current location yaw angle acquisition member 1303 includes yaw angle database storage and reference member 1304. Data representing a correlation of the absolute location (e.g., the longitude and the latitude) and the yaw angle at the corresponding point are stored in the yaw angle database storage and reference member 1304. Based on the absolute location received from the position information acquisition member 903, the current location yaw angle acquisition member 1303 extracts, from the yaw angle database storage and reference member 1304, the yaw angle corresponding to the absolute location. The yaw angle correction and absolute posture angle estimation member 1302 is provided by using, for example, a set consisting of a microprocessor (CPU) and a program for a general-purpose computer. For processing member 1320 in this aspect, the output of processing member 1010 is employed as output indicating whether the absolute posture angle that is obtained and output by the yaw angle correction and absolute posture angle estimation member 1302 is reliable.

The processes performed by the individual member in this aspect are also performed by a program for a general-purpose computer. The processing performed by such a program will now be described.

Figure 24:
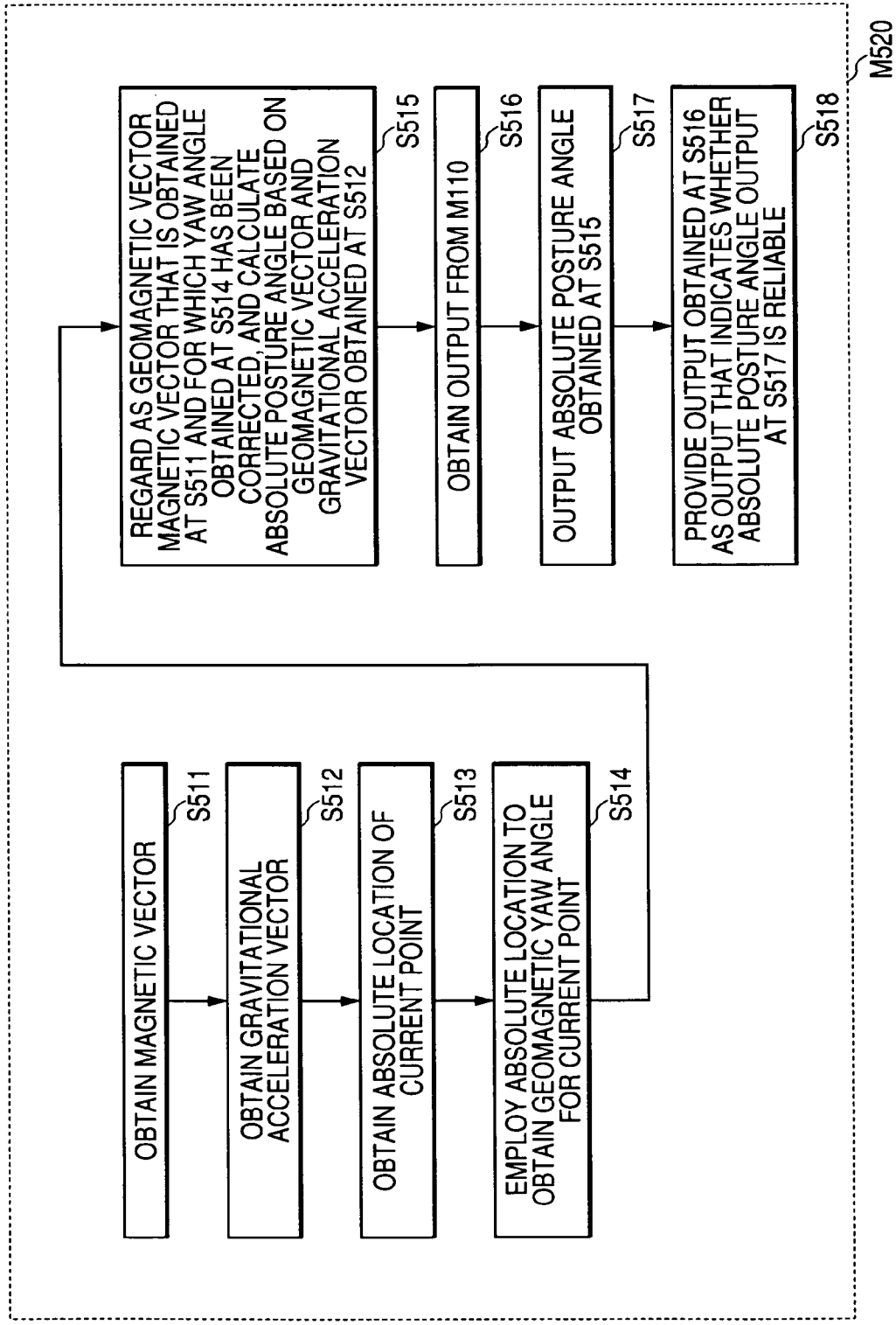
FIG. 24 is a flowchart showing the processing corresponding to the seventeenth aspect.

The flowchart in FIG. 24 shows the processing corresponding to the seventeenth aspect. During this processing, first, at step S511, magnetic vectors for three axes are obtained, at step S512, gravitational acceleration vectors for three axes are obtained, and at step S513, the absolute current location is obtained. At step S514, the geomagnetic yaw angle of the current location is obtained, based on the absolute location obtained at step S513. At step S515, the yaw angle obtained at step S514 is corrected for the magnetic vectors obtained at step S511, the corrected magnetic vectors are regarded as geomagnetic vectors, and the current absolute posture angle is calculated, based on the geomagnetic vectors and the gravitational acceleration vectors obtained at step S512. At step S516, the output of the module M210 (true or false) is obtained. At step S517, the current absolute posture angle obtained at step S515 is output as output 1 of this module M520. At step S518, the output obtained at step S516 is regarded as a signal (a true signal or a false signal) indicating whether the absolute posture signal output at step S517 is reliable, and this signal is output as output 2 of the module M520.

Figure 25:
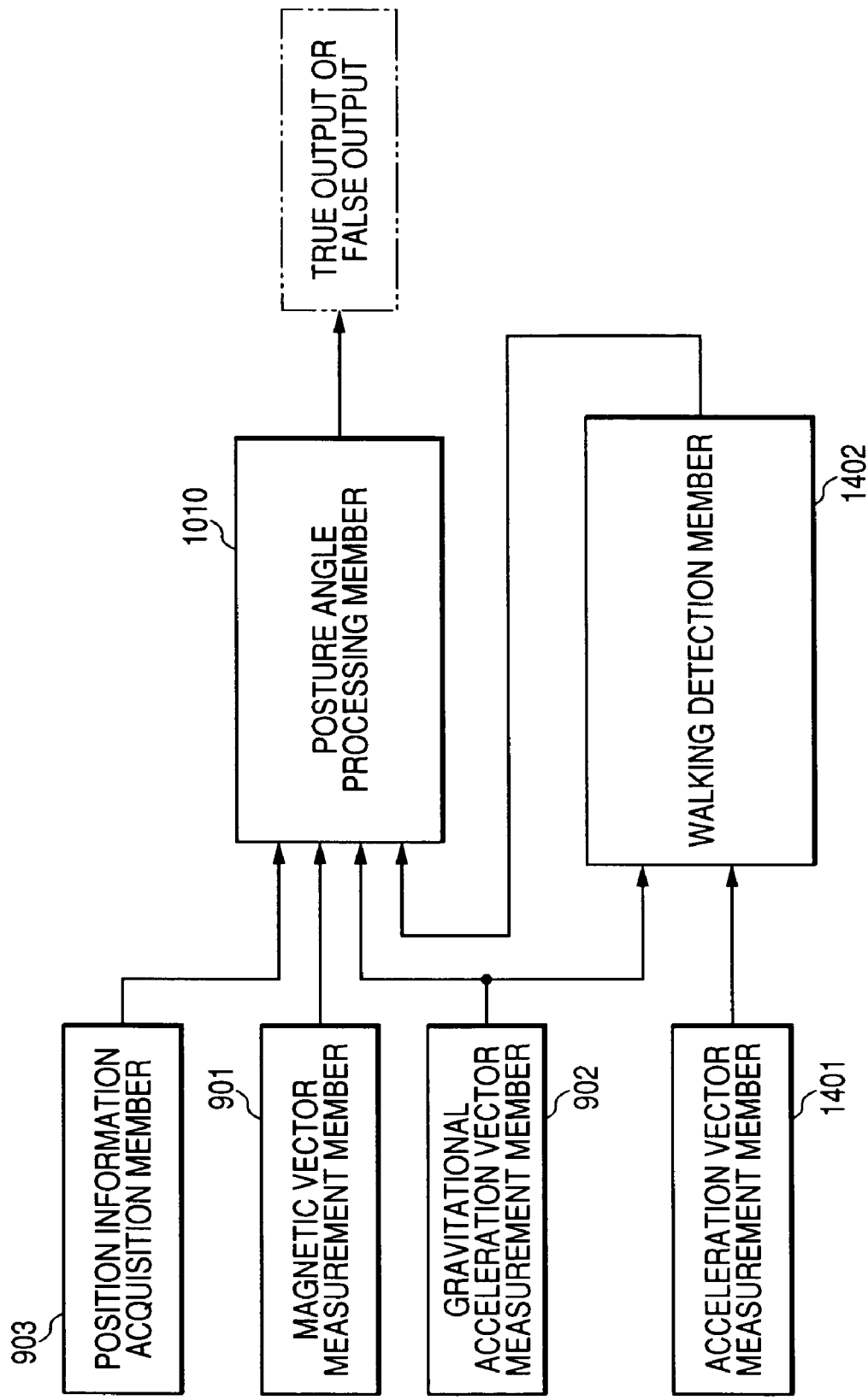
FIG. 25 is a block diagram showing an eighteenth aspect of the present invention.

FIG. 25 is a block diagram showing an eighteenth aspect of the present invention. In the aspect shown in FIG. 25, the walking detection member 1201 in the fifteenth aspect in FIG. 19 is replaced by walking detection member 1402, which detects walking, based on acceleration vectors that are detected by gravitational acceleration vector measurement member 902 and acceleration vector measurement member 1401.

The processes performed by the individual member in this aspect are also performed by a program for a general-purpose computer. The processing performed by such a program will now be explained.

Figure 26:
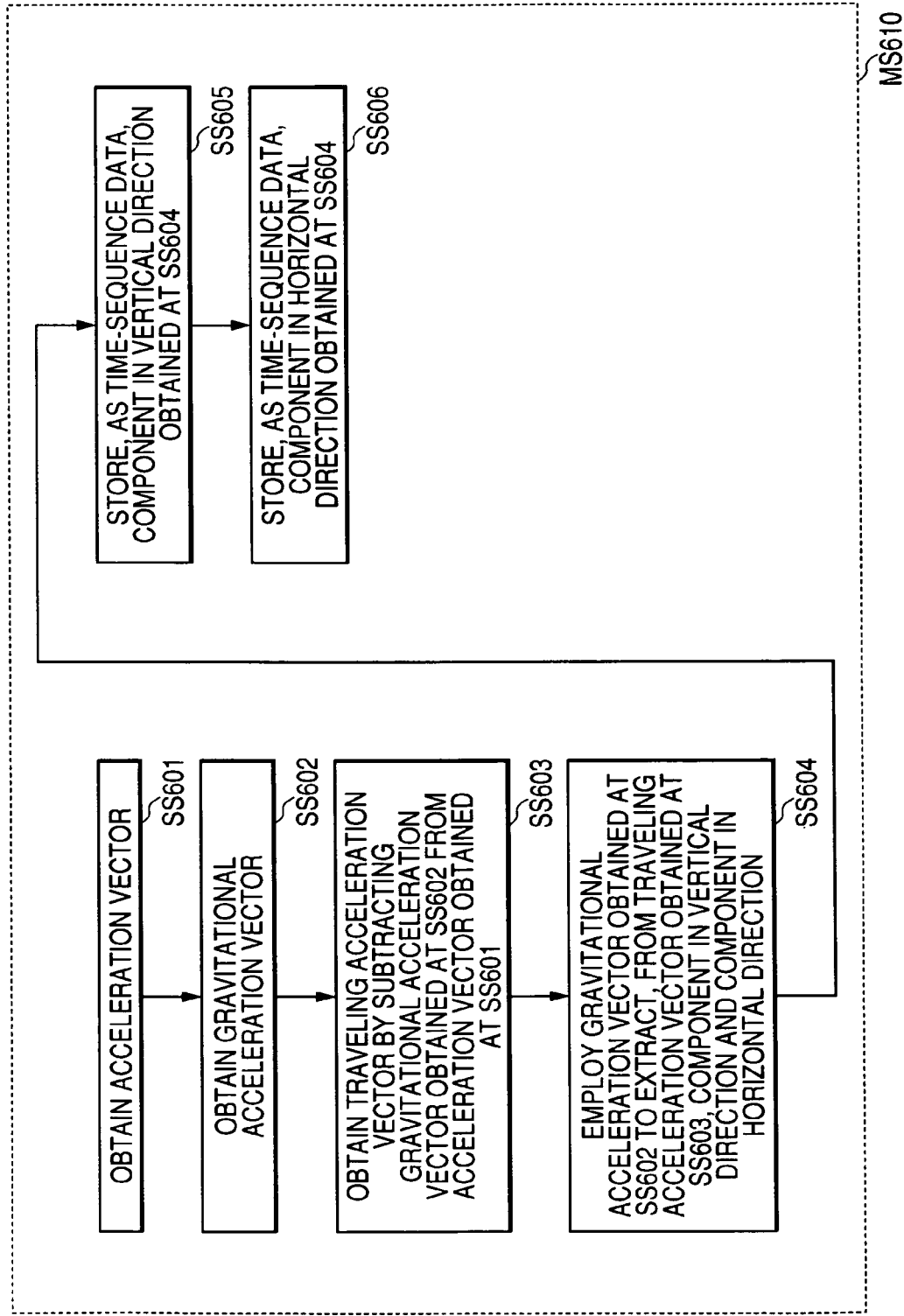
FIG. 26 is a first flowchart showing the processing corresponding to the eighteenth aspect.
Figure 27:
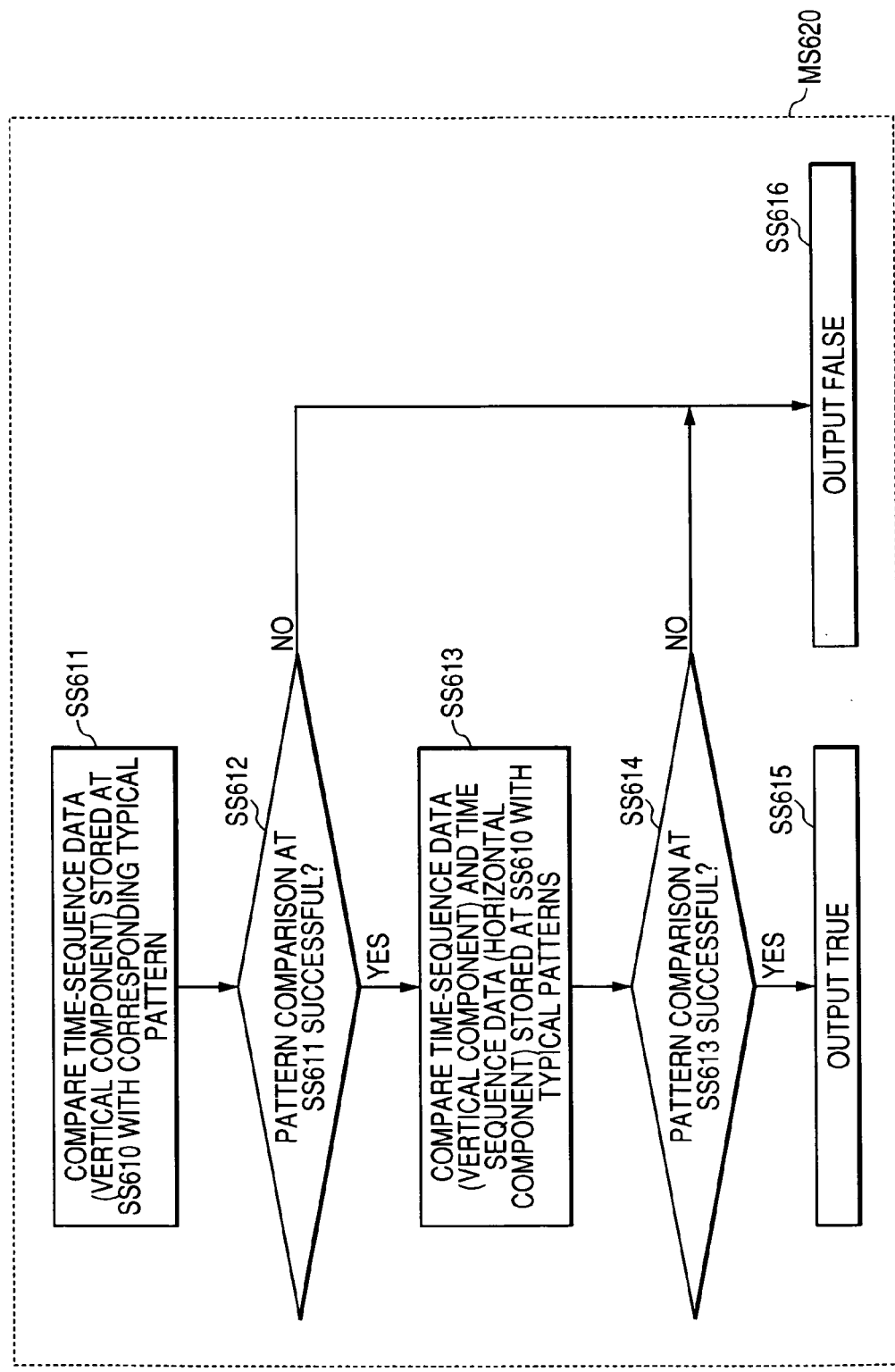
FIG. 27 is a second flowchart showing the processing corresponding to the eighteenth aspect.
Figure 28:
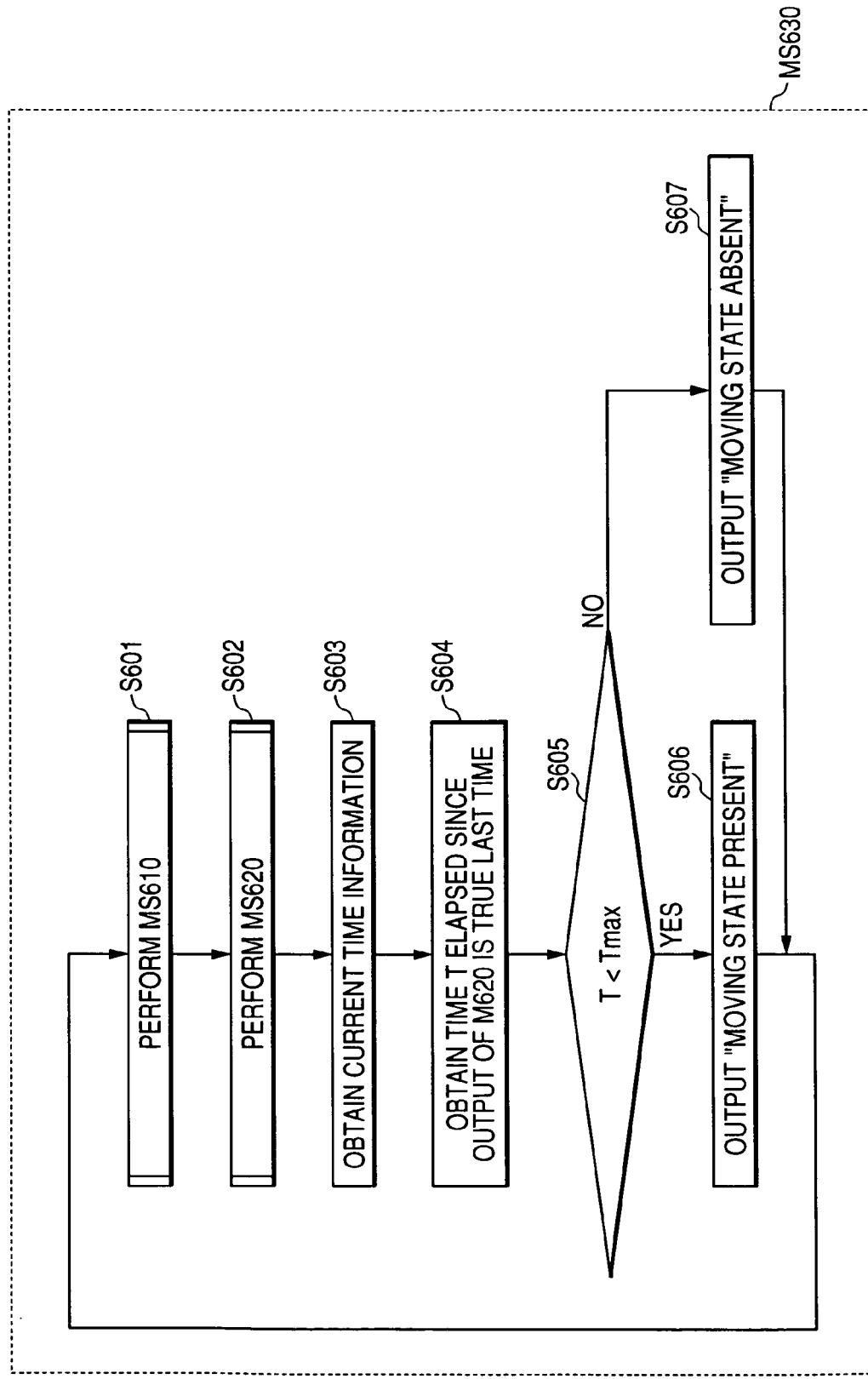
FIG. 28 is a third flowchart showing the processing corresponding to the eighteenth aspect.

The flowchart in FIGS. 26, 27 and 28 shows the processing corresponding to the eighteenth aspect. A processing module MS630 in FIG. 28 includes a sub-processing module MS610 (FIG. 26) and a sub-processing module MS620 (FIG. 27) as components.

The processing performed by the sub-processing module MS610 is shown in FIG. 26. During this processing, at step SS601, acceleration vectors for three axes are obtained, and at step SS602, gravitational acceleration vectors for three axes are obtained. Since because of gravity the gravitational acceleration component is included in the acceleration vectors obtained at step SS601, at step SS603, in order to remove this component, the gravitational acceleration vectors obtained at step SS602 are subtracted from the acceleration vectors, and a traveling acceleration vector (an acceleration vector that does not include the gravitational acceleration component) is obtained. At step SS604, based on the gravitational acceleration vectors obtained at step SS602, the traveling acceleration vector is divided to the component in the vertical direction and the other component (i.e., the component in the direction of the horizontal plane), and these components are obtained. At step SS605, the component in the vertical direction that is obtained at step SS604 is stored as time-sequence data. Thereafter, at step SS606, the component in the direction of the horizontal plane, obtained at step SS604, is stored as time-sequence data.

The processing performed by the sub-processing module M620 is shown in FIG. 27. During this processing, first, at step SS611, the time-sequence data for the component in the vertical direction, which have been stored by the sub-processing module MS610, are extracted for a specific period of time. And the extracted time-sequence data are compared with a typical pattern, created by walking, for the component in the vertical direction of the traveling acceleration vector to determine whether the data and the pattern roughly match (match within a predetermined error). Then, at step SS612, a check is performed to determine whether the comparison at step SS611 is successful. When the comparison is successful, program control is shifted to step SS613. When the comparison fails, program control is shifted to step SS616. At step SS613, the time-sequence data for the component in the direction of the horizontal plane, which have been stored by the sub-processing module MS610, are extracted for a specific period of time. And the extracted time-sequence data are compared with a typical pattern, created by walking, for the component in the direction of the horizontal plane of the traveling acceleration vector to determine whether the data and the pattern roughly match (match within a predetermined error). Then, at step SS614, a check is performed to determine whether the comparison is successful. When the comparison is successful, program control is shifted to step SS615, or when the comparison fails, program control is shifted to step SS616. At step SS615, true is issued as the output of the sub-processing module MS620. At step S5616, false is issued as the output of the sub-processing module MS620. As a result, the sub-processing module MS620 outputs a true signal or a false signal.

The processing performed by the processing module MS630 is shown in FIG. 26. During the processing for this processing module, first, at step S601, the process for the sub-processing module MS610 is performed, and at step S602, the process for the sub-processing module MS620 is performed. Then, at step S603, the current time information is obtained. Sequentially, at step S604, a time T elapsed since the last output of the sub-processing module MS620 was true is measured and obtained following this, at step S605, the time T obtained at step S604 and a predesignated value Tmax are compared. When T<Tmax is established, program control is shifted to step 5606, or in other cases, program control is shifted to step 5607. At step 5606, a signal indicating "moving state present" is output as the output of this module MS630. At step 5607, a signal indicating "moving state absent" is output as the output of the processing module MS630. The processing module MS630 is employed, for example, as the moving detection member at step S202 in the flowchart in FIG. 14.

Figure 29:
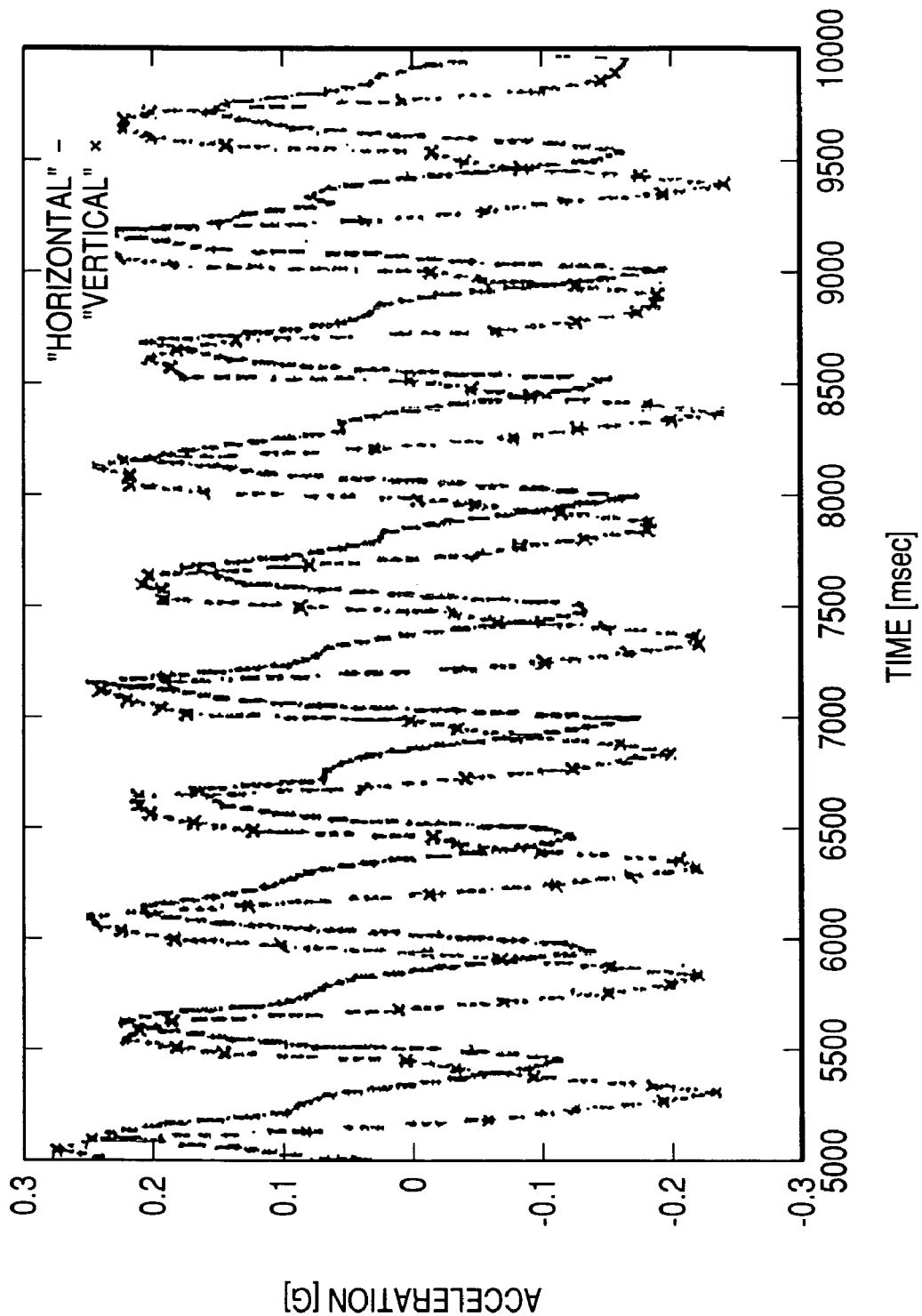
FIG. 29 is a diagram for explaining a pattern for a change in acceleration while walking.

FIG. 29 is a diagram for explaining the pattern for changing acceleration while walking. In FIG. 29, a typical pattern is shown (in the graph, the label "vertical" is allocated for the component in the vertical direction, and the label "horizontal" is allocated for the component in the direction of the horizontal plane). According to a typical pattern created during walking, a change in acceleration is characterized in that the component in the direction of the horizontal plane is raised, sequentially, the component in the vertical direction is increased, the component in the direction of the horizontal plane reaches the peak first and then the component in the vertical direction reaches the peak, while the component in the direction of the horizontal plane is dropped first and then the component in the vertical direction is dropped. By identifying this pattern, walking can be accurately detected.

Figure 30:
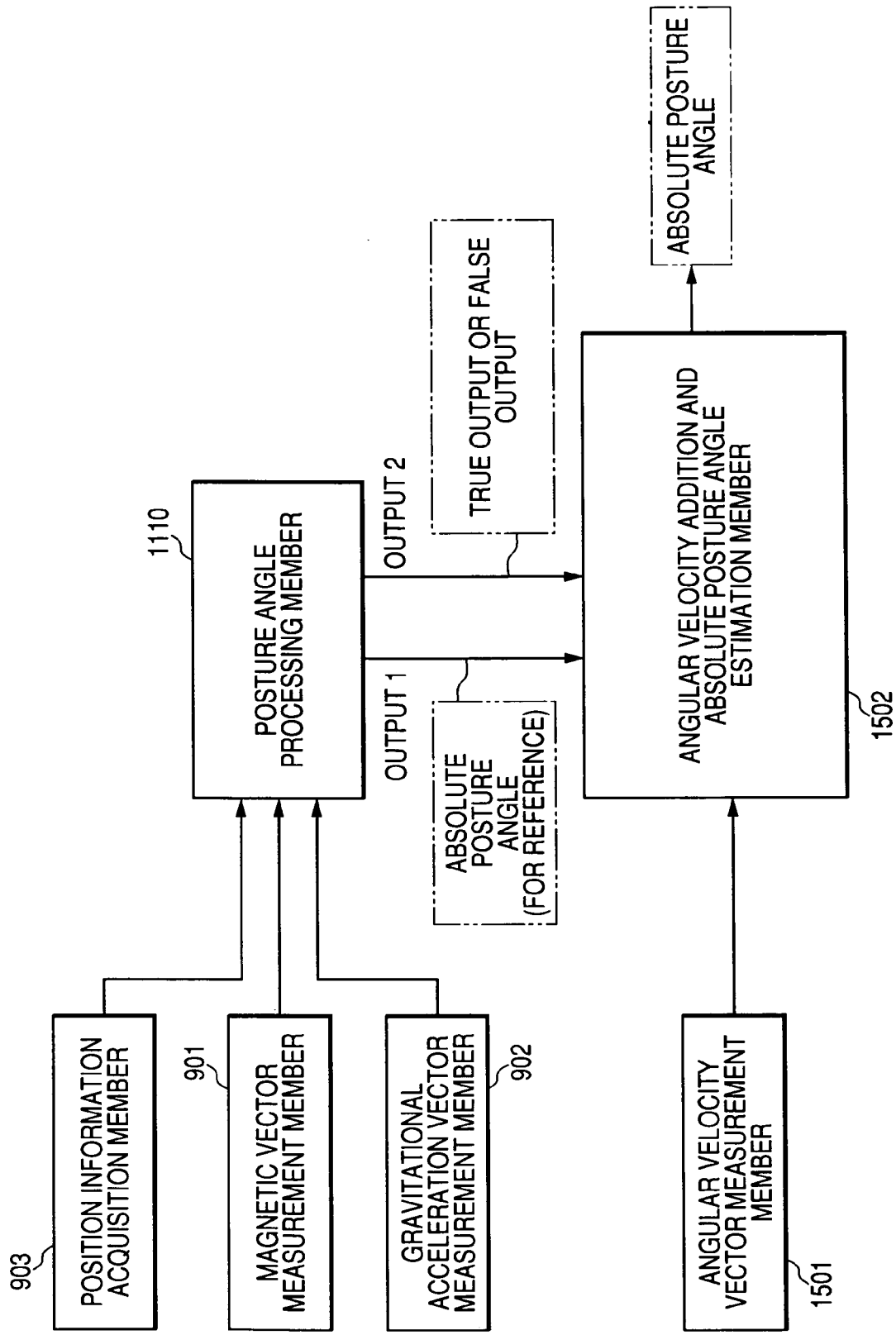
FIG. 30 is a block diagram showing a nineteenth aspect of the present invention.

FIG. 30 is a block diagram showing a nineteenth aspect of the present invention. In the aspect shown in FIG. 30, in addition to the aspects shown in FIGS. 15 and 17, an apparatus further includes angular velocity vector measurement member 1501 and angular velocity addition and absolute posture angle estimation member 1502. The angular velocity vector measurement member 1501 measures an angular velocity vector along three axes for an object to be measured, and is provided by using, for example, three gyrosensors ENC-03J, marketed by Murata MFG. Co., Ltd. The angular velocity addition and absolute posture angle estimation member 1502 receives the absolute posture angle (output 1) that is output as a reference by posture angle processing member 1110 (or posture angle processing member 1120) and the output (output 2) indicating whether the absolute posture angle is reliable, and outputs the current absolute posture angle. When the output 2 indicates true, the angular velocity addition and absolute posture angle estimation member 1502 designates, as a reference absolute posture angle, the absolute posture angle obtained as output 1, and outputs this angle as the current absolute posture angle. When the output 2 indicates false, the angular velocity addition and absolute posture angle estimation member 1502 updates the reference absolute posture angle, based on an angular velocity vector that is measured by the angular velocity vector measurement member 1501, and outputs the updated results as the current absolute posture angle.

The processes performed by the individual member in this aspect are also performed by a program for a general-purpose computer. The processing performed by such a program will now be described.

Figure 31:
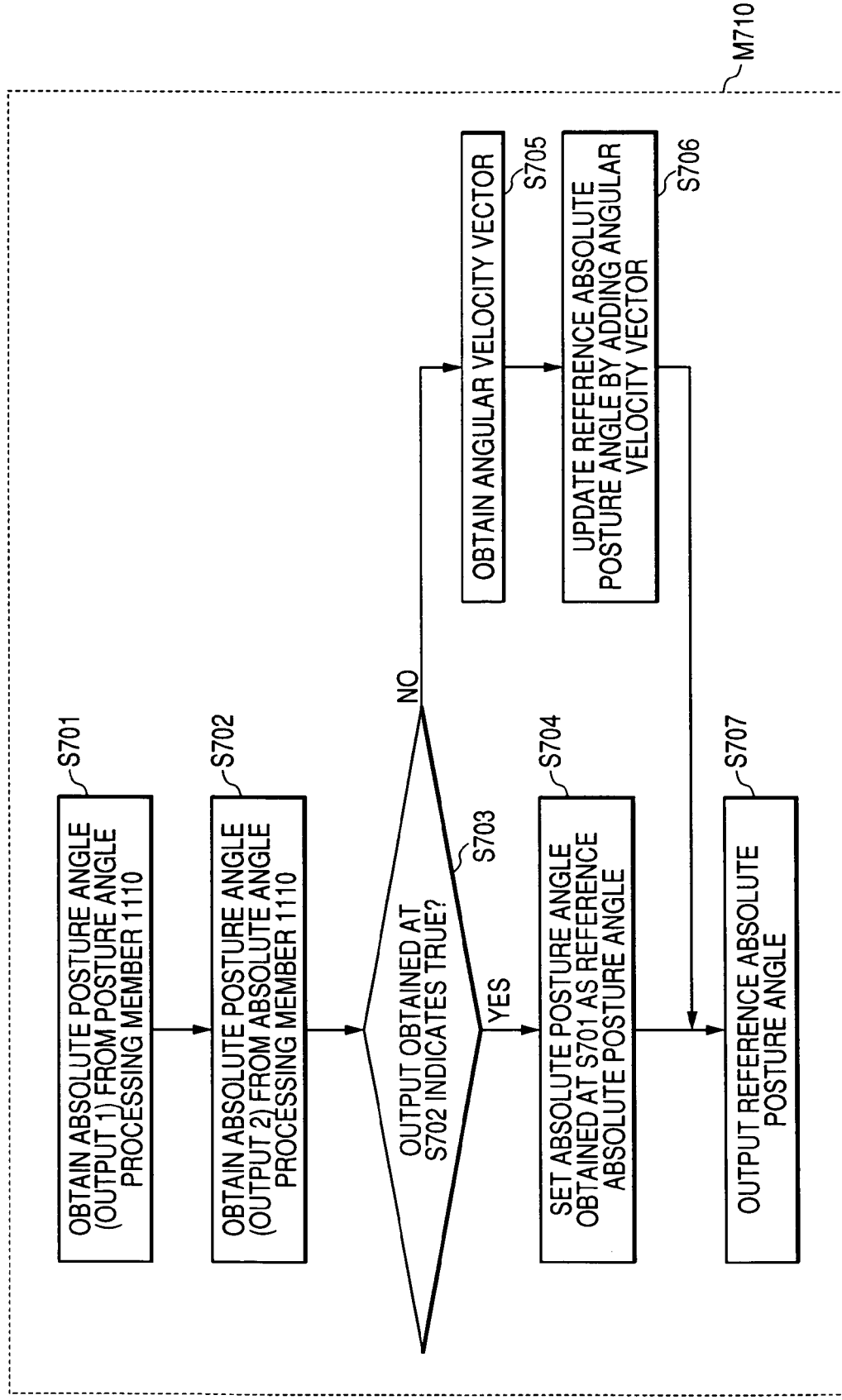
FIG. 31 is a flowchart showing the processing corresponding to the nineteenth aspect.

The flowchart shown in FIG. 31 shows the processing corresponding to the nineteenth aspect. During this processing, at step S701, the absolute posture angle (output 1) is obtained from posture angle processing member 1110, and at step S702, the output (output 2: true or false) of the posture angle processing member 1110 is obtained. When, at step S703, the output obtained at step S702 indicates true, program control is shifted to step S704, or when the output obtained at step S703 indicates false, program control is shifted to step S705. At step S704, the absolute posture angle obtained at step S701 is set as a reference absolute posture angle. At step S705, an angular velocity vector along three axes is obtained, and at step S706, the reference absolute posture angle is updated by adding the angular velocity vector obtained at step S705. Then, at step S707, the reference absolute posture angle is output as the output of this processing module M710.

Figure 32:
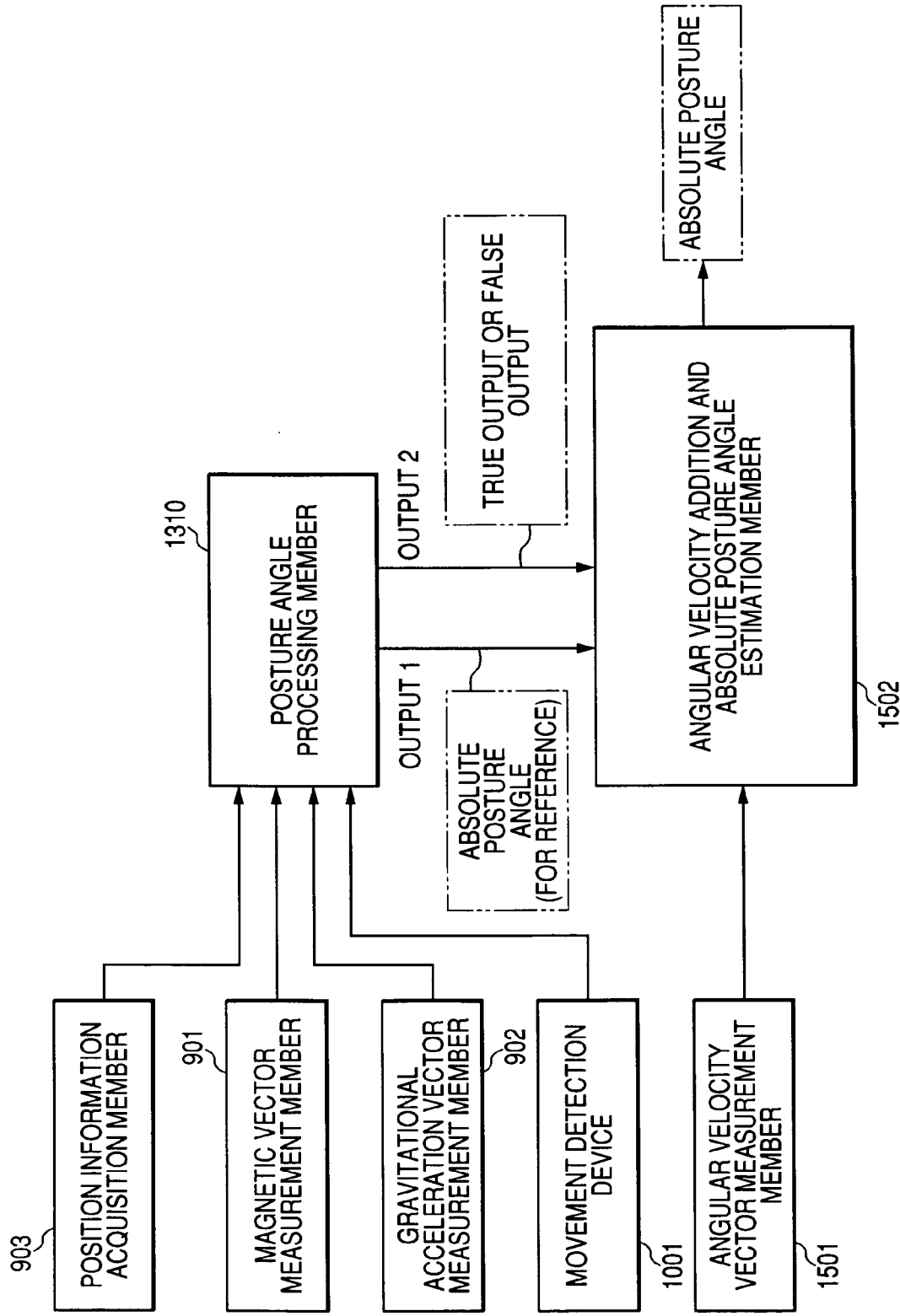
FIG. 32 is a block diagram showing a twentieth aspect of the present invention.

FIG. 32 is a block diagram showing a twentieth aspect of the present invention. In the aspect in FIG. 32, angular vector measurement member 1501 and angular velocity addition and absolute posture angle estimation member 1502 are additionally provided for the configuration of the aspects shown in FIGS. 21 and 23. The angular velocity vector measurement member 1501 measures an angular velocity vector along three axes for an object to be measured. The angular velocity addition and absolute posture angle estimation member 1502 receives the absolute posture angle (output 1) that is output as a reference by posture angle processing member 1310 and the output (output 2) indicating whether the absolute posture angle (output 1) is reliable, and outputs the current absolute posture angle. When the output 2 indicates true, the angular velocity addition and absolute posture angle estimation member 1502 designates, as a reference absolute posture angle, the absolute posture angle obtained as the output 1, and outputs this angle as the current absolute posture angle. When the output 2 is false, the angular velocity addition and absolute posture angle estimation member 1502 updates the reference absolute posture angle, based on an angular velocity vector along three axes, that is measured by the angular velocity vector measurement member 1501, and outputs the updated results as the current absolute posture angle.

The processes performed by the individual member in this aspect are also performed by a program for a general-purpose computer. The processing performed by such a program will now be described.

Figure 33:
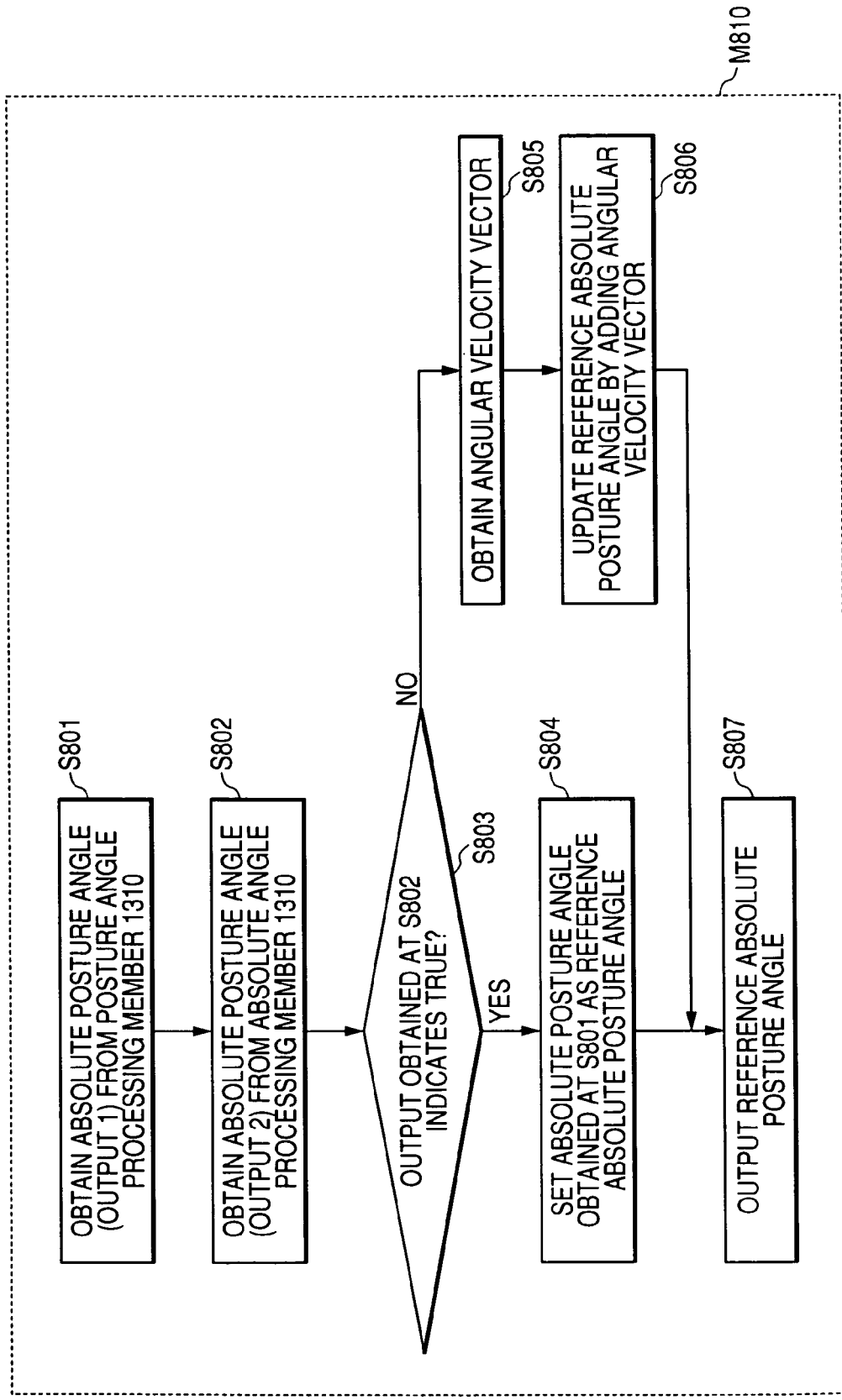
FIG. 33 is a flowchart showing the processing corresponding to the twentieth aspect.

The flowchart in FIG. 33 shows the processing corresponding to the twentieth aspect. During this processing, at step S801, the absolute posture angle (output 1) is obtained from posture angle processing member 1310, and at step S802, the output (output 2) of the posture angle processing member 1310 is obtained. When, at step S803, the output obtained at step S802 is true, program control is shifted to step S804, or when the output obtained at step S803 is false, program control is shifted to step S805. At step S804, whereat program control has been shifted while assuming that the output is true, the absolute posture angle obtained at step S801 is set as a reference absolute posture angle. At step S805, whereat program control has been shifted while assuming the output is false, an angular velocity vector along three axes is obtained, and at step S806, the reference absolute posture angle is updated by adding the angular velocity vector obtained at step S805. Then, at step S807, the reference absolute posture angle is output as the output of a module M810.

INDUSTRIAL APPLICABILITY

According to the present invention, a posture angle processing apparatus that can correctly obtain information for a posture angle can be provided whereby, while being carried by a person, for example, correct information for the posture angle of the person can be obtained even in an environment wherein the stable acquisition of a reliable geomagnetic vector is difficult because of a disruption caused by a magnetic field. In this case, information indicating whether the information for the posture angle that is output is reliable is also output, so that the information obtained for the posture angle can be variously and effectively employed.

The invention claimed is:

1. A posture angle processing apparatus comprising:
a magnetic sensor for detecting a magnetic vector;
a gravitational acceleration sensor for detecting a gravitational acceleration vector;
a position information acquisition device for obtaining an absolute location for a current point;
a dip angle database device for storing a correlation of the absolute location and a geomagnetic dip angle at a corresponding point; and
a dip angle estimation and determination device, for, based on the absolute location of the current point received from the position information acquisition device, reading a geomagnetic dip angle for the current point from the dip angle database device, for employing the magnetic vector detected by the magnetic sensor and the gravitational acceleration vector detected by the gravitational acceleration sensor to calculate an angle formed by a horizontal plane and the magnetic vector, for comparing the angle formed by the magnetic vector and the horizontal plane with the geomagnetic dip angle for the current point, and for, when an error between the angle and the geomagnetic dip angle is within a predetermined range, outputting a true signal indicating that the magnetic vector detected by the magnetic sensor is reliable as a geomagnetic vector, and in other cases, outputting a false signal indicating that the current magnetic vector is not reliable.

2. The posture angle processing apparatus according to claim 1, further comprising:
a movement detection device for detecting the presence or absence of a moving state; and
a signal output device, for, when the movement detection device is detecting a moving state over a predesignated moving distance or over a predesignated moving period of time, and when the dip angle estimation and determination device is continuously outputting a true signal, outputting a true signal indicating that the current magnetic vector detected by the magnetic sensor is reliable as a geomagnetic vector, and in other cases, outputting a false signal indicating that the current magnetic vector is not reliable.

3. The posture angle processing apparatus according to claim 1, further comprising:
an absolute posture angle estimation device, for, when the dip angle estimation and determination device is outputting a true signal, estimating and outputting an absolute posture angle based on the magnetic vector detected by the magnetic sensor and the gravitational acceleration vector detected by the gravitational acceleration sensor.

4. The posture angle processing apparatus according to claim 2, wherein
the movement detection device includes a walking detection device for detecting a person is walking to determine the presence or absence of a moving state.

5. The posture angle processing apparatus according to claim 2, further comprising;
an absolute posture angle estimation device, for, when the dip angle estimation and determination device is outputting a true signal, estimating and outputting an absolute posture angle based on the magnetic vector detected by the magnetic sensor and the gravitational acceleration vector detected by the gravitational acceleration sensor.

6. The posture angle processing apparatus according to claim 4, wherein
the walking detection device includes: an acceleration sensor for detecting the walking of the person; and
the walking detection device detects a vertical direction in accordance with the gravitational acceleration vector detected by the gravitational acceleration sensor, detects a typical pattern created by the walking of the person, in accordance with a component in the vertical direction included in the acceleration vector that is detected by the acceleration sensor, detects a typical pattern created by the walking of the person, in accordance with a component in the direction of a plane perpendicular to the vertical direction of the acceleration vector, and employs the detection results of these patterns to detect the walking of the person.

7. The posture angle processing apparatus according to claim 3, further comprising:
an angular velocity sensor, wherein
when the dip angle estimation and determination device is outputting a true signal, the absolute posture angle estimation device outputs, as a current absolute posture angle, the absolute posture angle output by the absolute posture angle estimation device, and
when the dip angle estimation and determination device is outputting a false signal, the absolute posture angle estimation device employs, as a reference, the last absolute posture angle that is output by the absolute posture estimation device, estimates the current absolute posture angle by adding an angular velocity vector measured by the angular velocity sensor, and outputs the results.

8. The posture angle processing apparatus according to claim 5, further comprising:
an angular velocity sensor, wherein
when the dip angle estimation and determination device is outputting a true signal, the absolute posture angle estimation device outputs, as a current absolute posture angle, the absolute posture angle output by the absolute posture angle estimation device, and when the dip angle estimation and determination device is outputting a false signal, the absolute posture angle estimation device employs, as a reference, the last absolute posture angle that is output by the absolute posture estimation device, estimates the current absolute posture angle by adding an angular velocity vector measured by the angular velocity sensor, and outputs the results.

9. A posture angle processing method by which a posture angle process is performed by a posture angle processing apparatus that includes: a magnetic sensor for detecting a magnetic vector, a gravitational acceleration sensor for detecting a gravitational acceleration vector, a position information acquisition device for obtaining an absolute location for a current point, a dip angle database device for storing a correlation of the absolute location and a geomagnetic dip angle at a corresponding point, and a data processing device, the posture angle processing method comprising the steps of:

based on an absolute location of a current point received from a position information acquisition device that obtains an absolute location of a current point, reading a geomagnetic dip angle for the current point from a dip angle database device wherein a correlation of the absolute location and the geomagnetic dip angle at the corresponding point is stored;

employing a magnetic vector detected by a magnetic sensor and a gravitational acceleration vector detected by a gravitational acceleration sensor to calculate an angle formed by a horizontal plane and the magnetic vector;

comparing the angle formed by the magnetic vector and the horizontal plane with the geomagnetic dip angle for the current point, and when an error between the angle and the geomagnetic dip angle is within a predetermined range, outputting a true signal indicating that the magnetic vector detected by the magnetic sensor is reliable as a geomagnetic vector, and in other cases, outputting a false signal indicating that the current magnetic vector is not reliable.

10. The posture angle processing method according to claim 9, wherein a movement detection device that detects the presence or absence of a moving state is detecting a moving state over a predesignated moving distance or over a predesignated moving period of time; and the angle formed by the magnetic vector is compared with the horizontal plane with the geomagnetic dip angle for the current point, and when an error between the angle and the geomagnetic dip angle is within a predetermined range, and when a true signal indicating that the magnetic vector detected by the magnetic sensor is reliable as a geomagnetic vector is continuously output, a true signal indicating that the current magnetic vector detected by the magnetic sensor is reliable as a geomagnetic vector is output, and in other cases, a false signal indicating that the current magnetic vector is not reliable is output.

11. The posture angle processing method according to claim 9, wherein the angle formed by the magnetic vector is compared with the horizontal plane with the geomagnetic dip angle for the current point, and when an error between the angle and the geomagnetic dip angle is within a predetermined range, and when a true signal indicating that the magnetic vector detected by the magnetic sensor is reliable as a geomagnetic vector is continuously output, an absolute posture angle is estimated and output based on the magnetic vector detected by the magnetic sensor and the gravitational acceleration vector detected by the gravitational acceleration sensor.

12. The posture angle processing method according to claim 10, wherein the movement detection device detects a person is walking to determine the presence or absence of a moving state.

13. The posture angle processing method according to claim 10, wherein the angle formed by the magnetic vector is compared with the horizontal plane with the geomagnetic dip angle for the current point, and when an error between the angle and the geomagnetic dip angle is within a predetermined range, and when a true signal indicating that the magnetic vector detected by the magnetic sensor is reliable as a geomagnetic vector is continuously output, an absolute posture angle is calculated and output based on the magnetic vector detected by the magnetic sensor and the gravitational acceleration vector detected by the gravitational acceleration sensor.

14. The posture angle processing method according to claim 12, wherein a vertical direction is detected in accordance with the gravitational acceleration vector detected by the gravitational acceleration sensor;

a typical pattern created by the walking of the person is detected, in accordance with a component in the vertical direction included in an acceleration vector that is detected by an acceleration sensor that detects walking of a person;

a typical pattern created by the walking of the person is detected, in accordance with a component in the direction of a plane perpendicular to the vertical direction of the acceleration vector; and the detection results of the patterns are employed to detect the walking of the person.

15. The posture angle processing method according to claim 11, wherein the angle formed by the magnetic vector is compared with the horizontal plane with the geomagnetic dip angle for the current point, and when an error between the angle and the geomagnetic dip angle is within a predetermined range, and when a true signal indicating that the magnetic vector detected by the magnetic sensor is reliable as a geomagnetic vector is continuously output, an absolute posture angle is output as a current absolute posture angle based on the magnetic vector detected by the magnetic sensor and the gravitational acceleration vector detected by the gravitational acceleration sensor; and when the true signal is not output, the last absolute posture angle that is output is employed as a reference to estimate the current absolute posture angle by adding an angular velocity vector measured by the angular velocity sensor, and the results are output.

16. The posture angle processing method according to claim 13, wherein the angle formed by the magnetic vector is compared with the horizontal plane with the geomagnetic dip angle for the current point, and when an error between the angle and the geomagnetic dip angle is within a predetermined range, and when a true signal indicating that the magnetic vector detected by the magnetic sensor is reliable as a geomagnetic vector is continuously output, an absolute posture angle is output as a current absolute posture angle based on the magnetic vector detected by the magnetic sensor and the gravitational acceleration vector detected by the gravitational acceleration sensor; and when the true signal is not output, the last absolute posture angle that is output is employed as a reference to estimate the current absolute posture angle by adding an angular velocity vector measured by the angular velocity sensor, and the results are output.

* * * * *

UNITED STATES PATENT AND TRADEMARK OFFICE
CERTIFICATE OF CORRECTION

PATENT NO.       : 7,222,045 B2
APPLICATION NO.  : 10/542360
DATED            : May 22, 2007
INVENTOR(S)      : Masakatsu Kourogi et al.

It is certified that error appears in the above-identified patent and that said Letters Patent is hereby corrected as shown below:

Title Page

Item (22), should read

--(22) PCT Filed: Jan. 14, 2004--

After Item (22), Items (86) and (87) should be inserted as follows

--(86) PCT No.: PCT/JP04/00184

§ 371 (c)(1),
(2), (4) Date: Apr. 14, 2006

(87) PCT Pub. No.: WO 2004/063667

PCT Pub. Date: Jul. 29, 2004--

Signed and Sealed this

Sixth Day of November, 2007

JON W. DUDAS
*Director of the United States Patent and Trademark Office*